US006899357B2

United States Patent
Rochelle

(10) Patent No.: US 6,899,357 B2
(45) Date of Patent: May 31, 2005

(54) FITTING AND PIPE SECTION FOR JETTED BATH HEATERS

(75) Inventor: Gary P. Rochelle, Marina del Rey, CA (US)

(73) Assignee: Alpha-Western Corporation, Gardena, CA (US)

( * ) Notice: Subject to any disclaimer, the term of this patent is extended or adjusted under 35 U.S.C. 154(b) by 50 days.

(21) Appl. No.: 10/076,865

(22) Filed: Feb. 14, 2002

(65) Prior Publication Data

US 2002/0125716 A1 Sep. 12, 2002

Related U.S. Application Data

(63) Continuation-in-part of application No. 09/805,673, filed on Mar. 12, 2001.

(51) Int. Cl.[7] ............................................. F16L 19/00
(52) U.S. Cl. ......................... 285/354; 285/388; 285/31
(58) Field of Search ............................. 285/31, 32, 15, 285/4, 387, 388, 354

(56) References Cited

U.S. PATENT DOCUMENTS 944,877 A * 12/1909 Koschinski ................ 285/388
3,781,925 A    1/1974 Curtis et al.
4,594,500 A    6/1986 Wright
4,747,212 A    5/1988 Cavdek
5,724,478 A    3/1998 Thweatt
5,872,890 A    2/1999 LaCombe
6,000,073 A   12/1999 Eddington
6,092,246 A    7/2000 Ludlow
6,154,608 A   11/2000 Rochelle
6,543,067 B2 * 4/2003 Eddington et al. ............ 285/31

* cited by examiner

Primary Examiner—David Bochna
(74) Attorney, Agent, or Firm—Christensen O'Connor Johnson Kindness PLLC

(57) ABSTRACT

A pipe section (112) that is operable to be installed in tubing (120A and 120B) of a jetted bath to render the tubing adaptable to accept a close fit device (130). The pipe section includes a removable hollow center segment (116) disposed between end fittings (118A and 118B) and grooves (117A and 117B). The grooves (117A and 117B) on the pipe section (112) define the hollow center segment (116) guide post-installation cutting of the pipe section at predetermined locations. The hollow center segment (116) may be selectively removed leaving the end fittings (118A and 118B) coupled to the tubing (120A and 120B). Once the center segment is removed, the close fit device may be installed between the end fittings (118A and 118B). In another aspect of the present invention, the center segment (416) is removed by unfastening the center segment from the end fittings (418A and 418B).

35 Claims, 26 Drawing Sheets

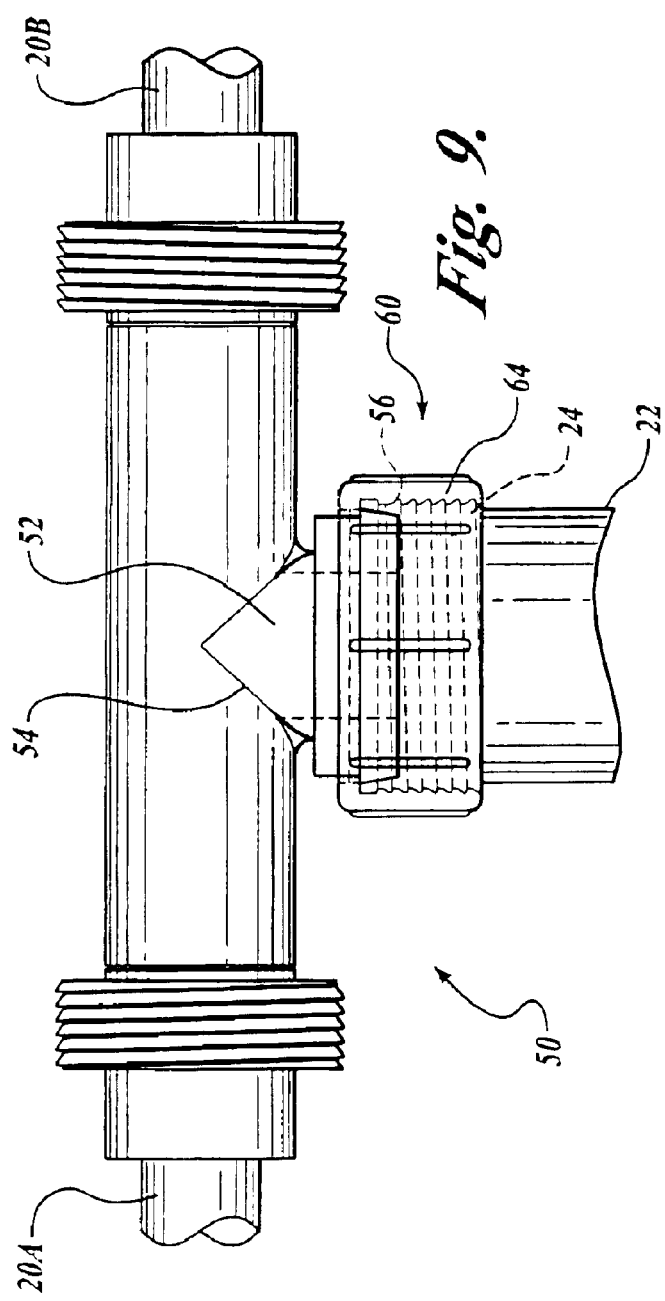
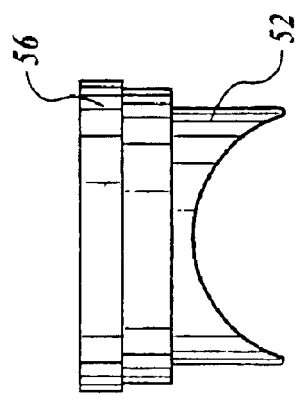
Fig. 9.
Fig. 10.

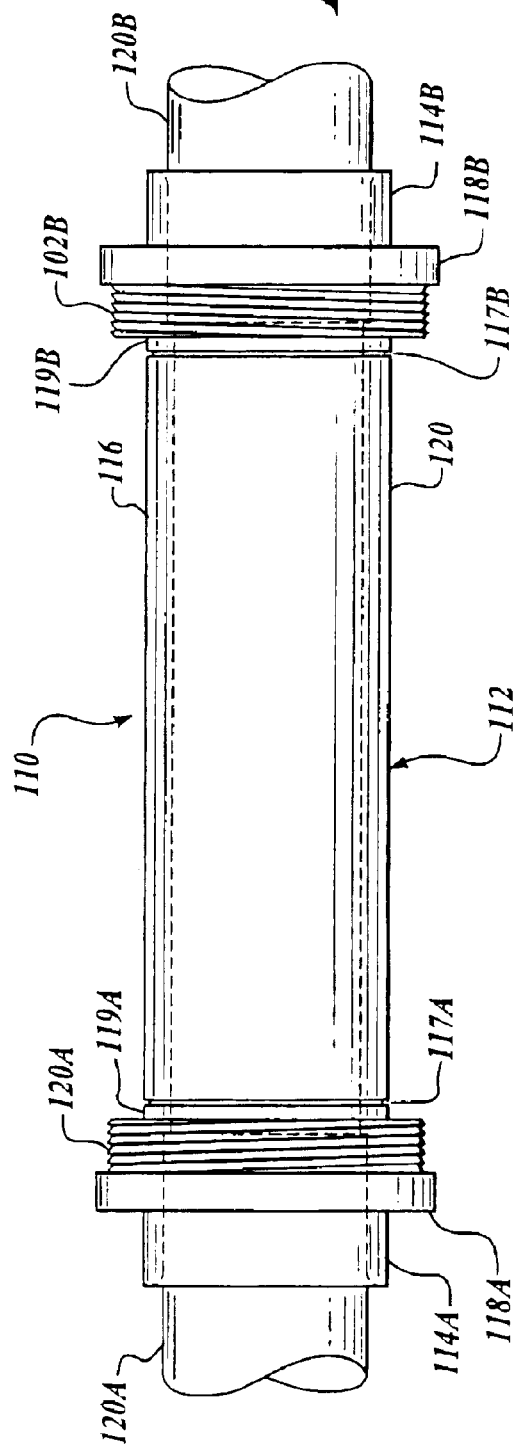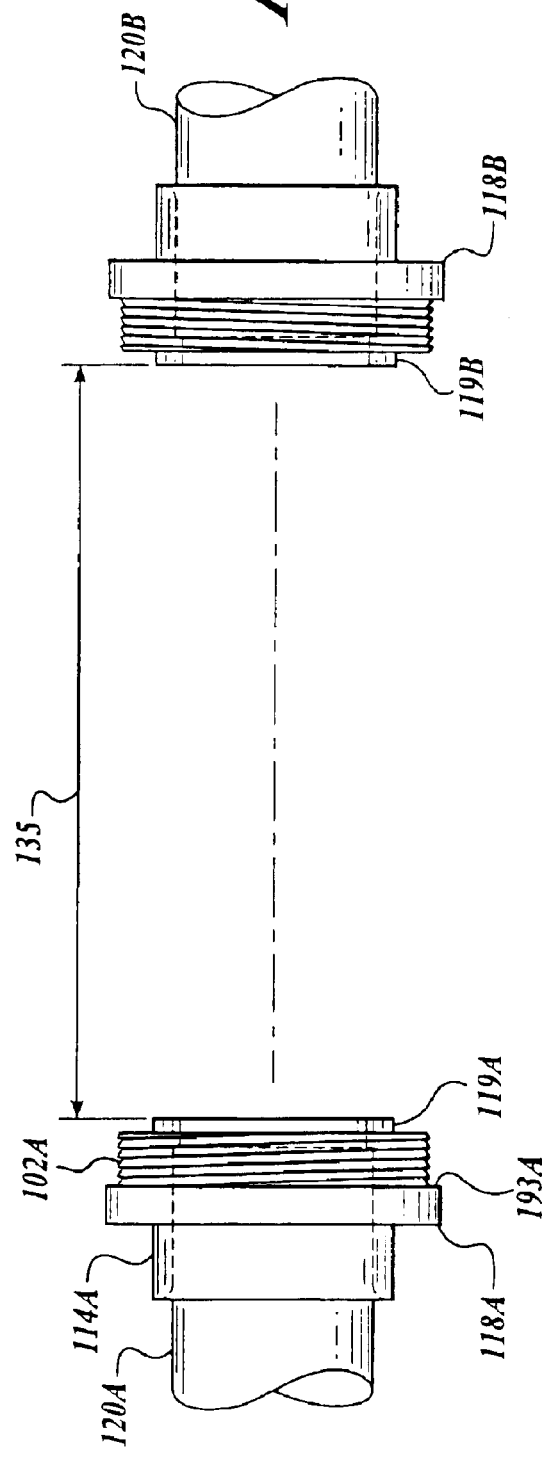

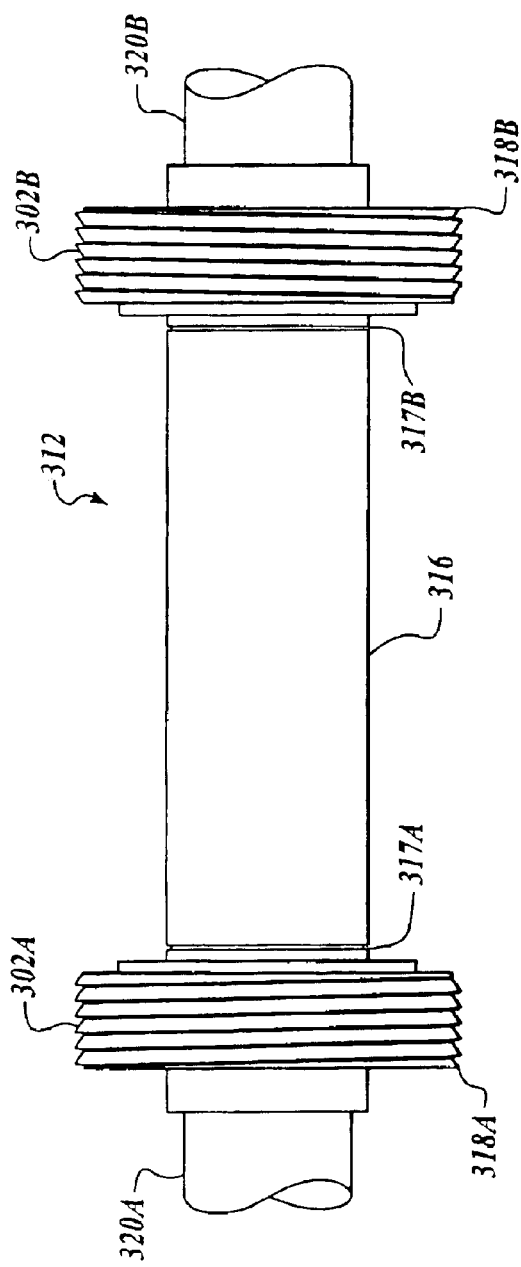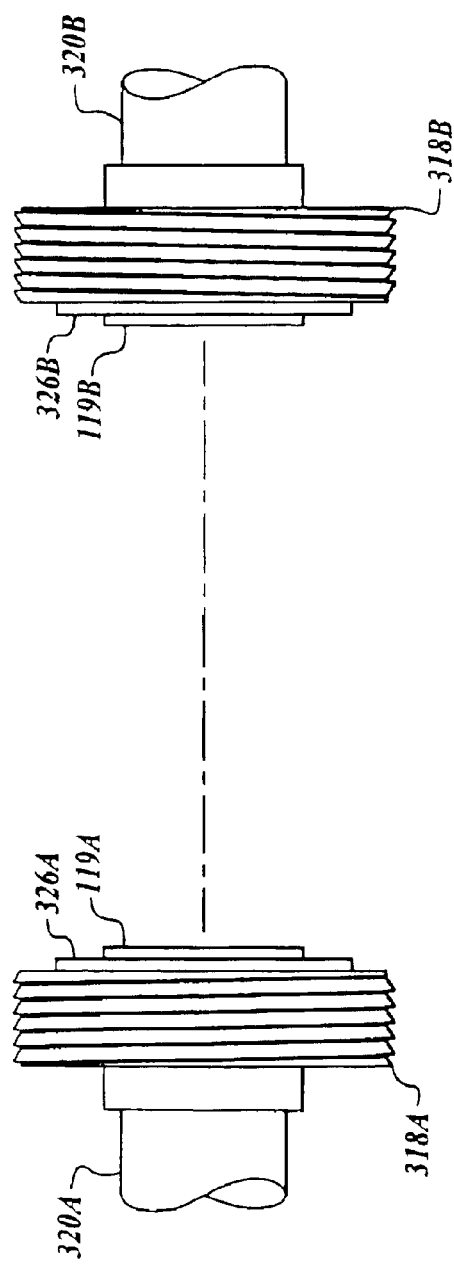
Fig. 18.
Fig. 19.

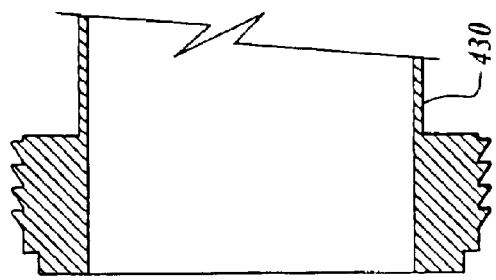
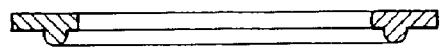
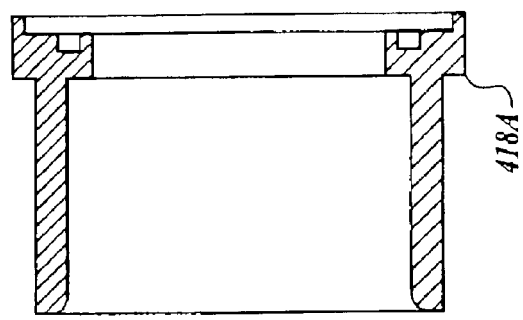
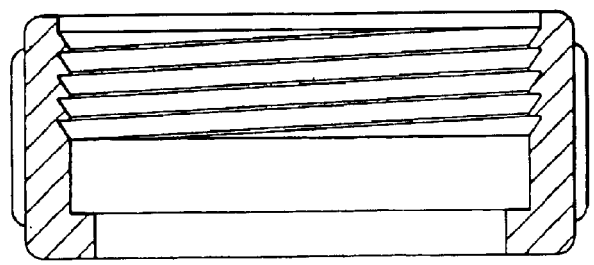
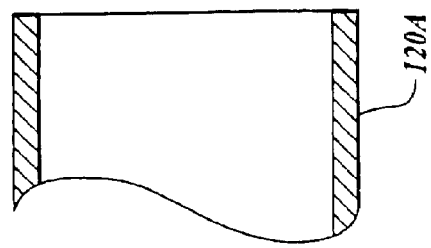
Fig. 24A.

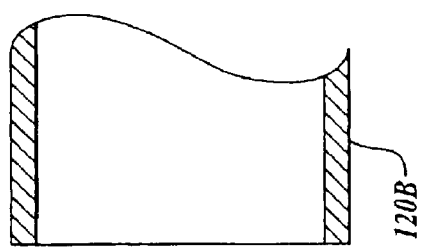
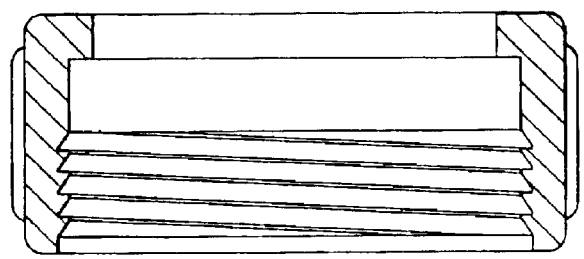
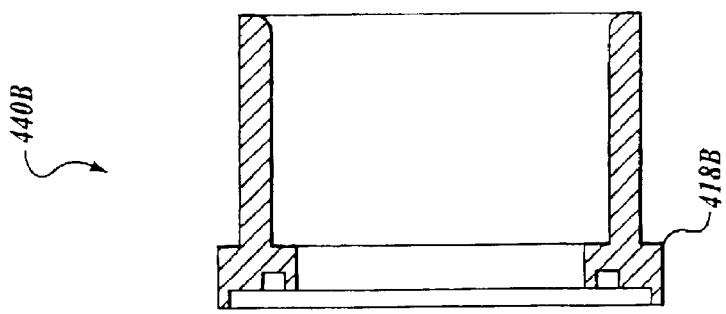
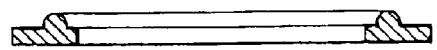
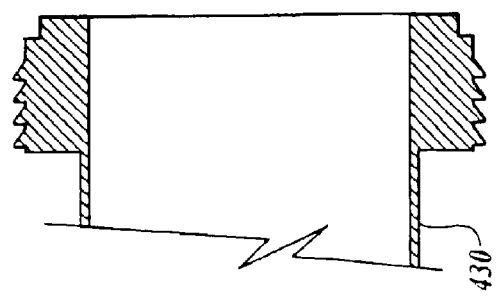
Fig. 24B.

FITTING AND PIPE SECTION FOR JETTED BATH HEATERS

CROSS-REFERENCE TO RELATED APPLICATION

This application is a continuation-in-part of prior application Ser. No. 09/805,673, filed Mar. 12, 2001, the disclosure of which is hereby expressly incorporated by reference and priority from the filing date of which is hereby claimed under 35 U.S.C. § 120.

FIELD OF THE INVENTION

The present invention relates to heaters for jetted baths, spas, above-ground pools and the like and, more particularly, to fitting and pipe sections that may be pre-installed to assist in subsequent modification of the jetted bath.

BACKGROUND OF THE INVENTION

Jetted baths include tubing that circulates water from the bath through a pump and back into the bath through jets. Jetted baths may be provided with a heater in the tubing circuit that acts to maintain bath water temperature after filling. Often it is advantageous or necessary to install these devices after the initial construction of the jetted bath (or other personal soaking reservoir) or after home installation of the jetted bath. Post-construction installation of these devices enables a limited number of product variations to be produced by a manufacturer, which can be modified later to meet the particular needs of an end-user. This has the advantage of limiting manufacturing and purchase cost.

However, at present, post-construction installation typically will depend on a skilled plumber to cut or open the tubing of a jetted bath and affix a device in fluid flow communication with the jetted bath. This is often expensive and inconvenient for the end-user.

SUMMARY OF THE INVENTION

The present invention provides a fitting and pipe section assembly that is capable of being installed in tubing of a jetted bath to render the tubing adaptable to accept a close fit fluid flow device, such as a heater. The fitting and pipe section assembly includes a pipe section, first and second fittings, and first and second indicia. The pipe section has a center segment between inlet and outlet end portions. The inlet and outlet portions may be placed in fluid flow communication with an inlet and an outlet of the tubing. The first and second fittings are disposed on the inlet and outlet portions of the pipe section. The first and second indicia on the pipe section define the center segment of the pipe section and guide post-installation cutting of the pipe section at predetermined points. The center segment of the pipe section may be selectively removed, leaving the inlet and outlet portions including the first and second fittings. The fitting and pipe section assembly may accept the close fit device between the inlet and outlet portions of the fitting and pipe section assembly.

In one embodiment, the pipe section has grooves provided at predetermined points for cutting and has means for attaching to the close fit device insert once the cut center pipe segment is removed.

In a further aspect of the present invention, a method of modifying an installed jetted bath to accept a close fit device using a fitting and pipe section assembly that is installed in a segment of tubing of a jetted bath is provided. The method includes cutting the assembly along first and second indicia defined at first and second ends of a pipe section of the fitting and pipe section assembly. The cut pipe section is then removed from the fitting and pipe section assembly, creating a gap between the first and second end portions of the fitting and pipe section assembly. A close fit device is then inserted in the fitting and pipe section assembly gap without either longitudinal or lateral displacement of the first and second end portions of the fitting and pipe section assembly. The close fit device is then secured in fluid flow communication with the first and second end portions of the fitting and pipe section assembly.

In another embodiment of the invention, the pipe section has an additional connection extending from the pipe tubing. The extra connection is not cut when removed, but rather unscrewed from the bath tubing, and the close fit device will have a corresponding extra connection for attaching to the bath tubing.

In still yet another embodiment of the present invention, the pipe section is unfastened from the bath tubing and a close fit device is fastened in its place.

In one aspect of the present invention, a fitting and pipe section assembly is provided that can be pre-installed in a jetted bath or other personal soaking reservoir, which facilitates post-production or post-installation modification of the jetted bath. The present invention provides indicia that indicate where the pipe section should be cut so that a pre-sized close fit device can be inserted with a minimum gap of space between the remaining pipe section and the close fit device. These indicia eliminate any need to measure and mark the pipe section for cutting out a segment for insertion of a device. Further, where the indicia are physical grooves, the indicia ensure exact cuts by guiding the cutting device.

The present invention further provides fittings at either end of the assembly. These fittings eliminate the need to modify the tubing of the jetted bath to secure a device in fluid flow communication with the tubing of the jetted bath. These fittings also eliminate any need for the close fit device to be provided with means for fastening to the smooth surface of the tubing of the jetted bath. Thus, the fittings eliminate the need to use an adhesive to secure a post-production device in the tubing of the product, thereby increasing the ease of product alteration and the integrity of the altered product. All these features increase the ease in which an end-user of a jetted bath may modify the jetted bath.

Additionally, the present invention provides the ability for a manufacturer to designate the locations where post-production devices may be inserted into fluid flow communication with the tubing. This allows the manufacturer to ensure that later inserted devices will not have an adverse effect on the fluid flow characteristics in the tubing and will not unduly restrict any pumping device. The ability of manufacturers to designate the location of later added devices, thus ensuring the fluid flow characteristics, also assists in the manufacturers' ability to receive certification from regulatory agencies for products that are intended to be modified after initial production.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 is a side view of a T-shaped fitting and pipe section according to the present invention;

FIG. 10 is a side view of a transverse pipe branch of a T-shaped fitting and pipe assembly;

FIG. 14 is a side planar view of a pipe section formed in accordance with another embodiment of the present invention, with the pipe section connected to a first and a section tubing of a jetted bath;

FIG. 15 is a side view of the alternate embodiment of the pipe section of FIG. 14, where a center segment has been removed;

FIG. 18 is a side planar view of a pipe section formed in accordance with another embodiment of the present invention, where the pipe section is shown connected to a first and second tubing segment of a jetted bath;

FIG. 19 is a side planar view of the pipe section shown in FIG. 18, where a center segment has been removed;

FIG. 24A is an exploded cross-sectional view of the pipe section shown in FIG. 23, where the center segment has been unfastened and removed, showing a first end of a close fit device and further showing the end fitting and the fastening assembly for releasably and sealingly connecting the close fit device to the end fitting;

FIG. 24B is an exploded cross-sectional view of the pipe section shown in FIG. 23, where the center segment has been unfastened and removed, showing a second end of the close fit device shown in FIG. 24A, and further showing the end fitting and the fastening assembly for releasably and sealingly connecting the close fit device to the end fitting;

DETAILED DESCRIPTION OF THE PREFERRED EMBODIMENT

Figure 1:
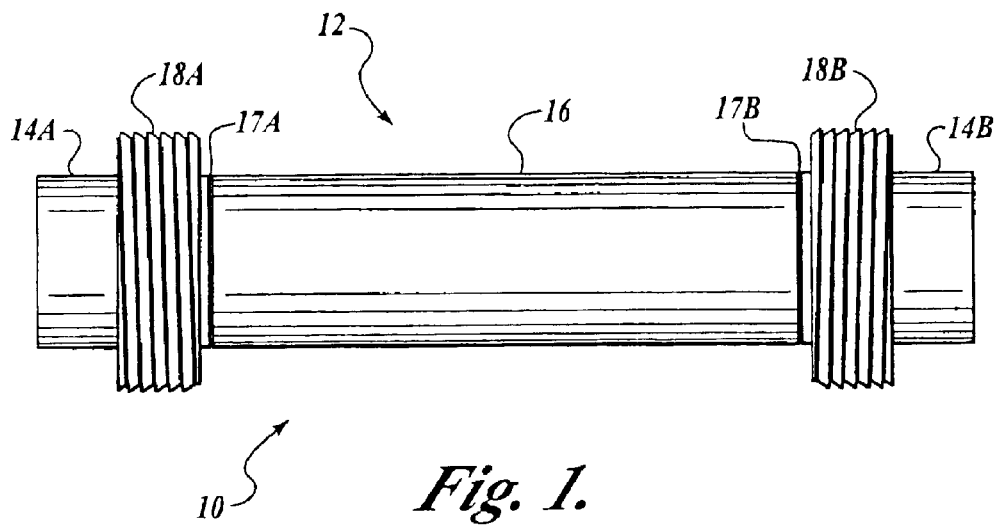
FIG. 1 is a side view of a fitting and pipe section according to the present invention.

A first embodiment of a fitting and pipe section assembly 10, constructed in accordance with the present invention, is shown in FIG. 1. The fitting and pipe section assembly 10 is suitable for installation in an existing tubing network into which water is drawn, treated, and then reintroduced into a jetted bath. The fitting and pipe assembly 10 makes it possible to modify previously constructed and/or installed jetted baths to accept a "water treatment device," which is intended herein to mean a heater for raising or maintaining bath water temperature.

The fitting and pipe section assembly 10 includes a pipe section 12 and first and second fittings 18A and 18B, and is marked with first and second indicia 17A and 17B. The pipe section 12 has a center segment 16 between inlet and outlet end portions 14A and 14B, respectively. The first and second fittings 18A and 18B are disposed on the inlet and outlet portions 14A and 14B of the pipe section 12, respectively. The first and second indicia 17A and 17B on the pipe section 12 define the center segment 16 of the pipe section 12, and guide post installation cutting of the pipe section 12 at predetermined points. In one embodiment, the fitting and pipe section 10 is a unitary body.

Figure 2:
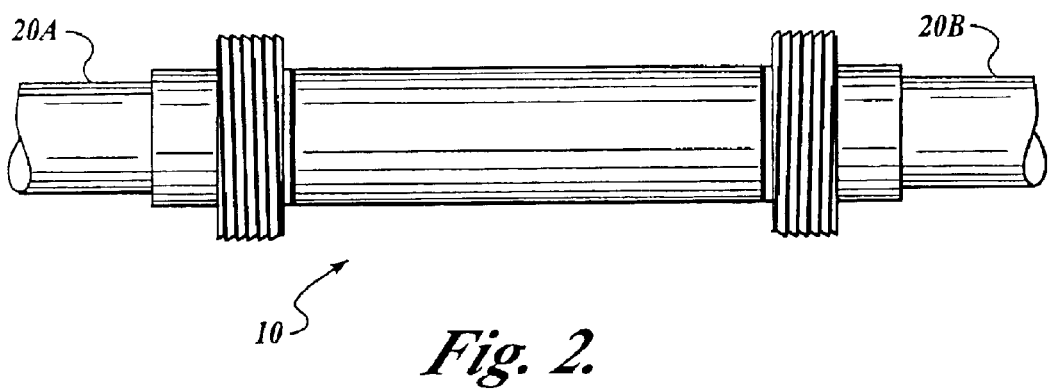
FIG. 2 is a side view of a fitting and pipe section connected to a tubing segment.

Referring to FIG. 2, the fitting and pipe section assembly 10 is capable of being installed in tubing 20A and 20B of a jetted bath. The inlet and outlet end portions 14A and 14B may be coupled in fluid flow communication to an inlet and an outlet of the tubing 20A and 20B, respectively. The fitting and pipe section assembly 10 may be coupled to the tubing 20A and 20B by adhesive, corresponding grooves and threads, or other known methods. Although FIG. 2 shows tubing 20 secured inside of the fitting and pipe section assembly 10, it will be understood that the fitting and pipe section assembly 10 could also be sized so that tubing 20 could be secured on the outer surface of the fitting and pipe section assembly 10.

Figure 3:
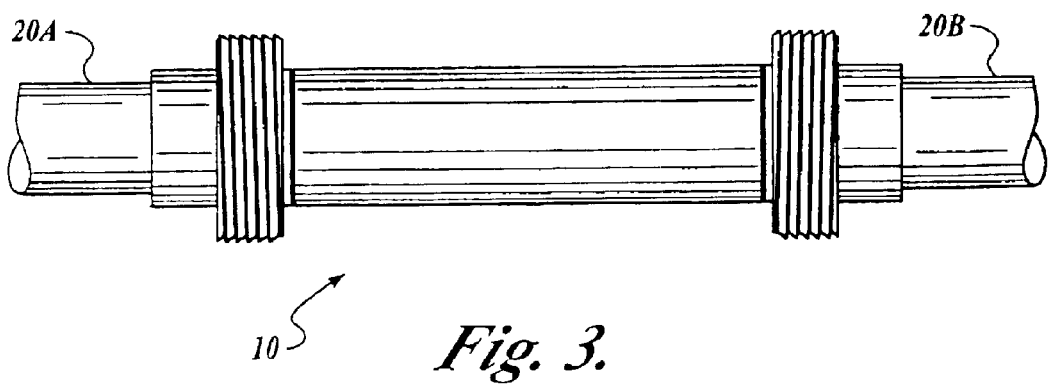
FIG. 3 is a side view of a fitting and pipe section, where the center segment has been removed.

Referring to FIG. 3, the pipe section 12 may be cut along the first and second indicia 17A and 17B. As shown in FIG. 3, the indicia 17A and 17B may be annular grooves in pipe section 12. These annular grooves act as both visual guides for where to cut the pipe section 12 and also act to physically guide and center a cutting device. The cutting device may be a blade, cable saw, or any similar device. In a preferred embodiment, the cutting device is a cable saw, which is automatically centered within the groove during cutting. Further, the fitting and pipe section assembly 10 may include the cutting device assembled therewith, such as a cable saw threaded through a polymeric tubing with its ends connected by swaging, wire, or polymeric tie. Once the cutting device has fully cut pipe section 12 along both the first and second indicia 17A and 17B, the center segment 16 may be removed laterally from the pipe section 12 without any longitudinal or lateral displacement of the remaining inlet and outlet portions 14A and 14B. Thus, the annular grooves ensure that there is proper spacing for inserting the close fit device 30, and that the inlet and outlet portions 14A and 14B have been cut straight and plumb. The removal of center segment 16 leaves the inlet and outlet portions 14A and 14B, including the first and second fittings 18A and 18B, connected to tubing 20A and 20B.

Figure 4:
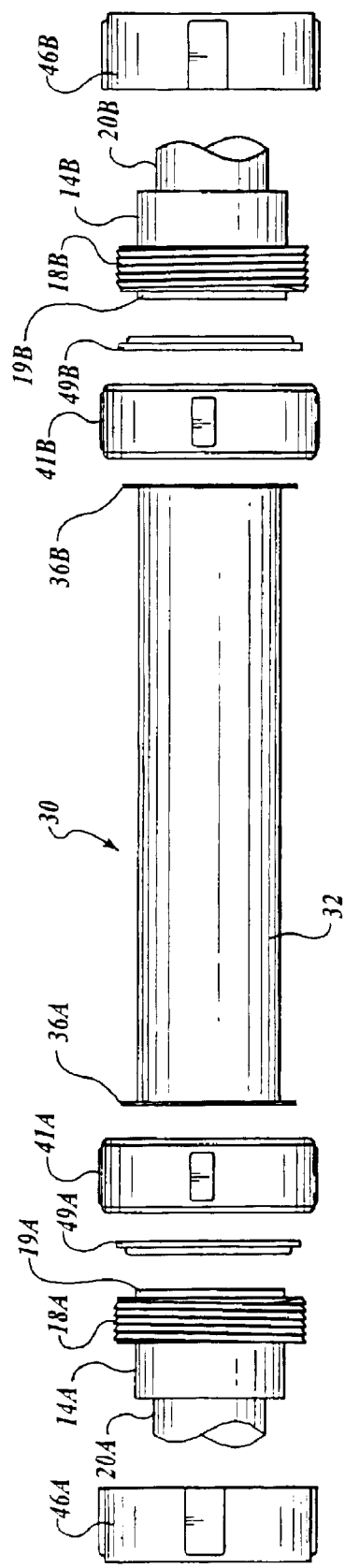
FIG. 4 is an exploded view of a fitting and pipe section, where the center segment has been removed and replaced with a close fit device and a split nut fastening assembly.
Figure 5:
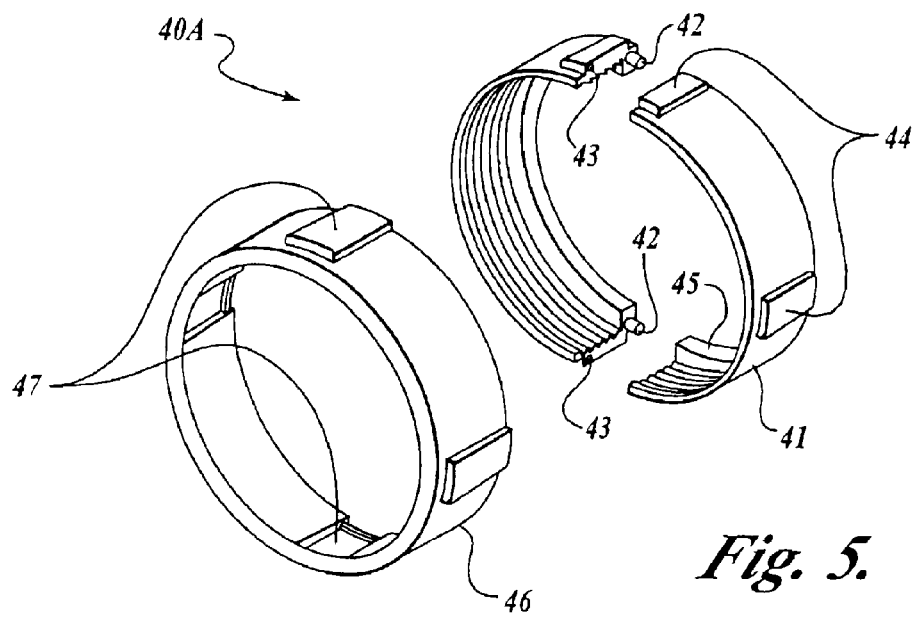
FIG. 5 is a perspective view of a split nut fastening assembly.
Figure 6:
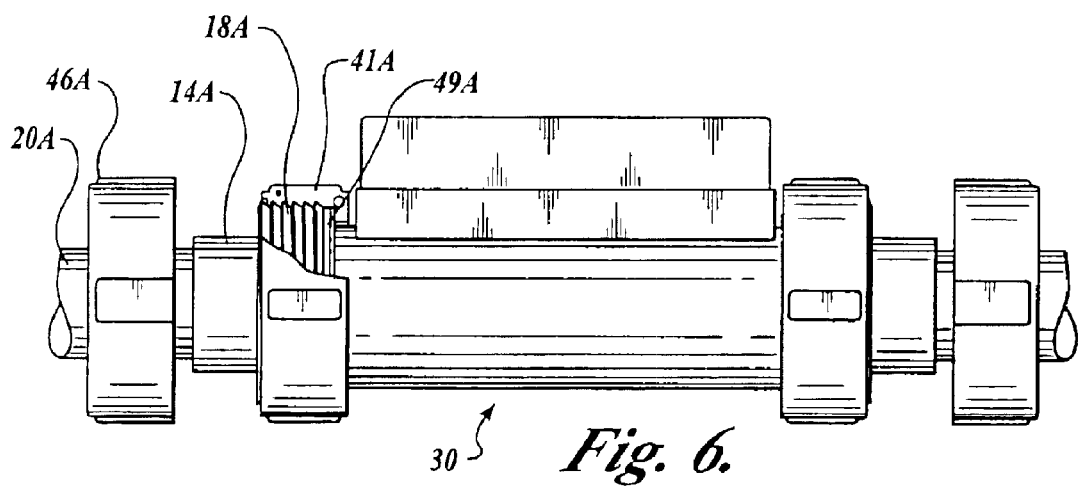
FIG. 6 is a cut-away view of a fitting and pipe section, where the pipe section has been removed and replaced with a close fit device and a split nut fastening assembly.

Referring to FIGS. 4–6, once the center segment 16 is removed, the resulting gap has an exact longitudinal dimension to accept a close fit device 30 and outer seals 49A and 49B, if necessary, between the inlet and outlet portions 14A and 14B of the fitting and pipe section assembly 10. In one embodiment, the indicia 17A and 17B are not placed flush with the fittings 18A and 18B, and are instead positioned a select distance along pipe section 12 away from the fittings 18A and 18B. This results in fitting lips 19A and 19B being formed when the center segment 16 is removed. The fitting lips are preferably the same width as the outer seals 49A and 49B, and assist in retaining the outer seals 49A and 49B in place against the fittings 18A and 18B. Alternatively, outer seals 49A and 49B may include raised portions which can be inserted into corresponding recesses in the vertical faces of fittings 18A and 18B to hold outer seals 49A and 49B in place.

It will be understood that the term "close fit device" 30, as used herein, includes a heater device for use in fluid flow communication with a jetted bath, which has a predetermined length, and which is received between stationary inlets and outlets separated by substantially the same predetermined distance as the length of the device, including outer seals 49A and 49B, if necessary, such that it may be installed and/or removed without displacement of the inlet and outlet. Thus, a close fit device 30 may include, but is not limited to, a heater that includes split nuts as in the embodiment described herein or that alternately includes a differing fastening assembly construction that allows close fit installation, such as a heater housing two-piece split and screwed nuts that may be slid back sufficiently on the heater body for installation and removal, or a two-piece nut and split retaining ring assembly, such as is disclosed in U.S. Pat. No. 5,775,743 to Rochelle, or other constructions. The close fit device 30 for use with the present invention includes a main body 32 and inlet and outlet 34A and 34B for fluid flow communication with the jetted bath tubing 20A and 20B, located at either ends of main body 32. The close fit device 30 also includes flanges 36A and 36B located respectively at the inlet and outlet ends 34A and 34B of close fit device 30.

Referring to FIG. 5, the close fit device 30 may be removably secured to the fitting and pipe section 10 by a first and second fastening assembly 40A and 40B. In one embodiment, shown in FIGS. 4–6, fastening assembly 40A includes a two-piece split nut 41A and a nut cover 46A. The fastening assembly 40A preferably also includes an outer seal 49A. The split nut 41A includes locking pins 42A, locking apertures 43A, locking tabs 44A, and split nut lip 45A. The locking pins 42A and locking apertures 43A are located along the surfaces dividing the two pieces of split nut 41A. The two pieces of split nut 41A may be removably secured together by locking pins 42A engaging locking apertures 43A. The locking tabs 44A are raised projections located on the outer surface of split nut 44. The nut cover 46A includes locking tab channels 47A that engage the corresponding locking tabs 44A of split nut 41A. Thus the locking tab channels 47A hold the split nut in place when the fastening assembly 40A is assembled. Fastening assembly 40B is a mirror image of fastening assembly 40A.

To removably seal the close fit device 30 in fluid flow communication with the tubing 20 of the jetted bath, the first and second nut covers 46A and 46B are slidably placed about tubing 20A and 20B, respectively. The first and second outer seals 49A and 49B may be positioned between the fittings 118A and 18B, respectively, and close fit device 30. Once the close fit device 30 is placed between the pipe inlet and outlet ends 14A and 14B, the first and second split nuts 41A and 41B may be slidably secured about the close fit device 30 connecting the two pieces of the split nuts 41A and 41B by inserting locking pins 42A and 42B into and engaging locking apertures 43A and 43B, respectively. Split nuts 41A and 41B rotatably engage the first and second fittings 18A and 18B, respectively. The split nut lips 45A and 45B likewise engage the close fit flanges 36A and 36B, respectively, thus securing the close fit device 30 to the fitting and pipe section 10. The nut covers 46A and 46B may now be slid so that the locking tab channels 47A and 47B engage the corresponding locking tabs 44A and 44B, thus preventing the locking pins 42A and 42B from disengaging locking apertures 43A and 43B, respectively. If the split nuts 41A and 41B are not tightly secured about fittings 18A and 18B, then the nut covers 46A and 46B and the split nuts 41A and 41B may be additionally rotated to tighten the connection between the fitting and pipe section 10 and the close fit device 30.

Figure 7:
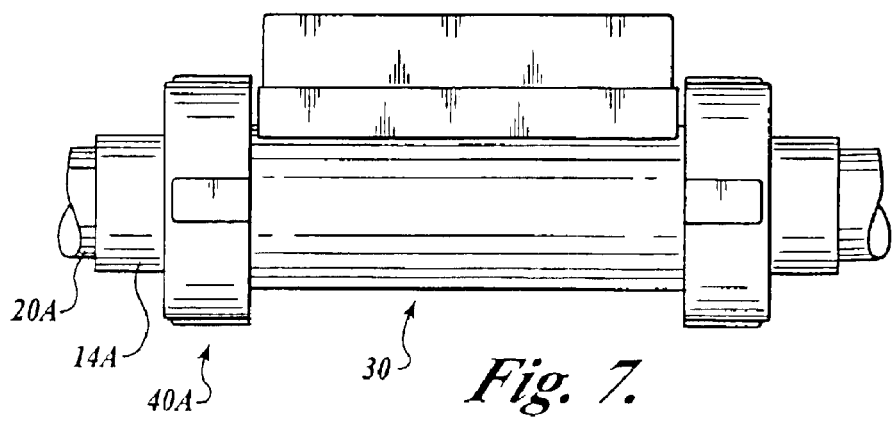
FIG. 7 is a perspective view of a fitting and pipe assembly, where the pipe section has been removed and replaced with a close fit device and a split nut fastening assembly.

Referring to FIG. 7, the fitting and pipe section 10 is shown with a close fit device 30 fully installed and in fluid flow communication with the tubing 20 of a jetted bath.

Figure 8:
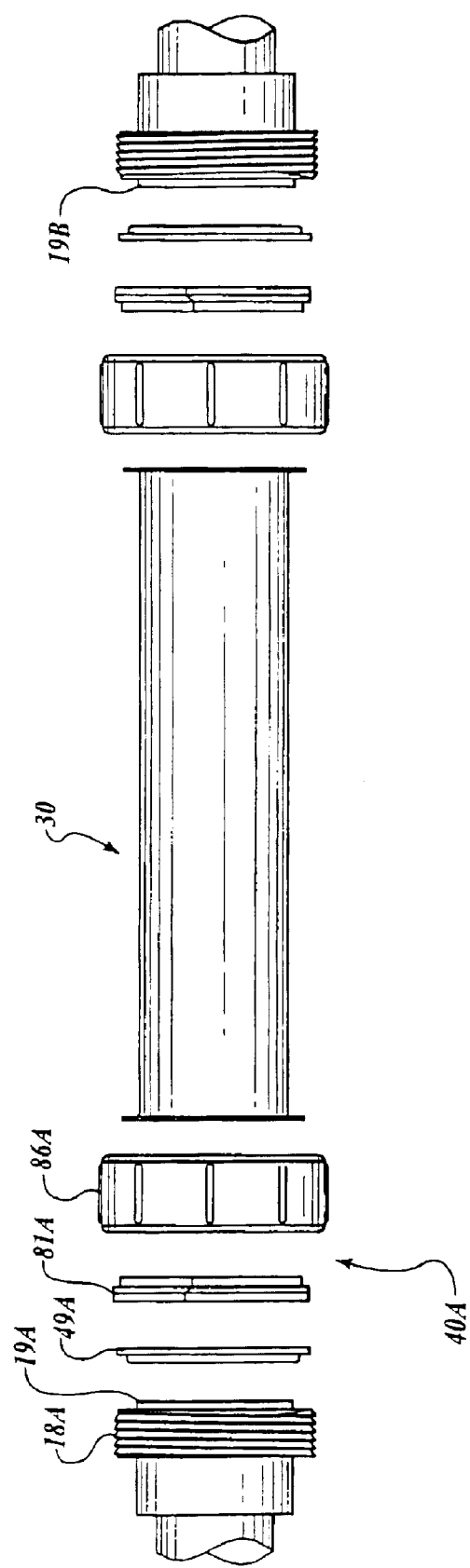
FIG. 8 is an exploded view of a fitting and pipe section, where the pipe section has been removed and replaced with a close fit device and a union nut fastening assembly.

It will be understood that the fastening assembly 40 is not limited to those embodiments described herein, but also encompasses any fastener or fastener assembly capable of securing the close fit device to fittings 18A and 18B. Referring to FIG. 8, an alternative embodiment of the fastening assembly 40 is shown. The alternative fastening assembly 40 includes a split nut retainer 81A, union nut 86A, and the outer seal 49A. When used to secure the close fit device 30 in fluid flow with the tubing 20 of the jetted bath, union nut 86A is slid about the close fit device 30 before the close fit device is inserted between the ends of the fitting and pipe section 10. Next, the two pieces of split nut retainer 81 A can be slidably and removably secured about close fit device 30 between the flange 36A and the union nut 86A. The union nut 86A rotatably engages the fitting 18A and the outer edge of the split nut retainer 81A. The inner edge of the split nut retainer also engages the close fit device flange 36A, allowing union nut 86A to secure the close fit device 30 to the fitting and pipe section 10. In another embodiment, a union nut could be slidably secured on the on the main body 32 of the close fit device 30 by placing the union nut about the main body 32 prior to formation of flanges 36A and 36B, and securing the union nut with the subsequent formation of flanges 36A and 36B. Alternatively, split nuts whose halves can be secured together—for example, by nut and bolt pairs connecting the halves—could also be used as fastening assembly 40.

In a second embodiment of the present invention, a T-shaped fitting and pipe section assembly 50, constructed in accordance with the present invention, is shown in FIG. 9. The fitting and pipe section assembly 50 includes a "T" junction with a transverse aperture 54 in the pipe section 12 between the inlet and outlet 14A and 14B. A transverse pipe branch 52 defining a port extends perpendicular to the pipe section 12 and is connected in fluid flow communication with the transverse aperture 54. The transverse pipe branch 52 includes a transverse flange 56.

In the second embodiment, the fitting and pipe section 50 is further capable of being installed with a transverse segment of tubing 22 of a jetted bath. The fitting and pipe section 50 may be removably secured to the transverse tubing segment 22 by transverse fastening assembly 60. In one embodiment, shown in FIG. 9, fastening assembly 60 includes a union nut 64. The fastening assembly 60 preferably also includes an inner seal 62. The union nut 64 can be slidably retained about the transverse pipe branch 52 by the transverse flange 56. Tubing 22 includes a transverse fitting 24 located at the end of tubing 22. The union nut 64 may removably engage the fitting and pipe section 50 to the tubing 22 by rotatably sealing fitting 24 to the transverse pipe branch 52. Additionally, an inner seal 62 may be provided that is captured between the fitting 24 and the transverse pipe branch 52.

It will be understood that alternative elements may be provided for removably engaging the pipe branch 52 to the tubing 22 without departing from the present invention. For example, in another embodiment, the transverse pipe branch 52 could be provided with a fitting and the transverse tubing segment 22, which could be provided with a nut to removably engage the transverse pipe branch 52. Additionally, the union nut 64 could be replaced with a fastening assembly similar to those described above, including split nut 41 and nut cover 46, or a split nut retainer 81 and union nut 86.

The center segment 16 may be removed in a similar manner to that provided in the first embodiment. However, if the transverse pipe branch is connected to the center segment 16 of pipe section 12, then the nut 56 must be rotatably disengaged from transverse tube fitting 24 for complete removal of center segment 16.

Figure 11:
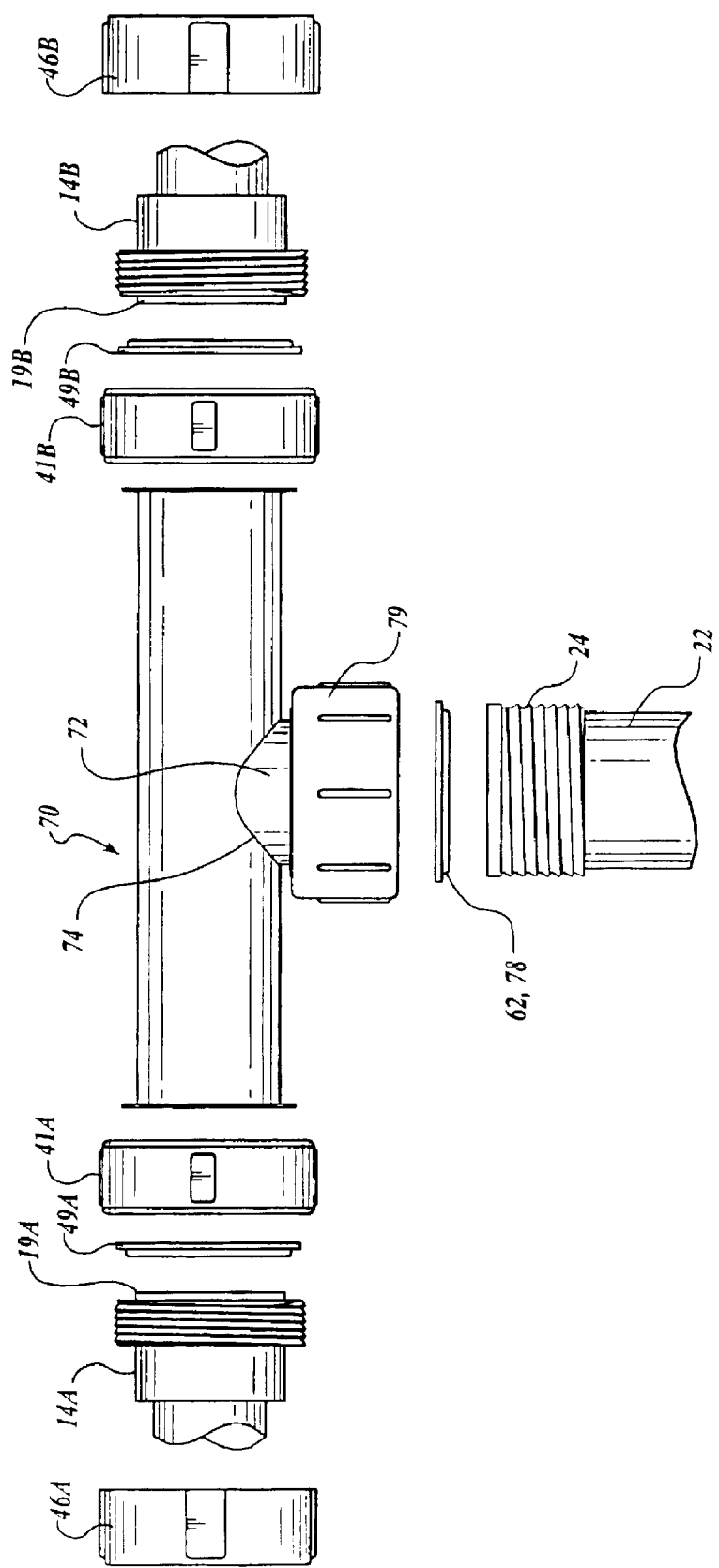
FIG. 11 is an exploded view of a T-shaped fitting and pipe section, where the pipe section has been removed and replaced with a T-shaped close fit device and a split nut fastening assembly.
Figure 12:
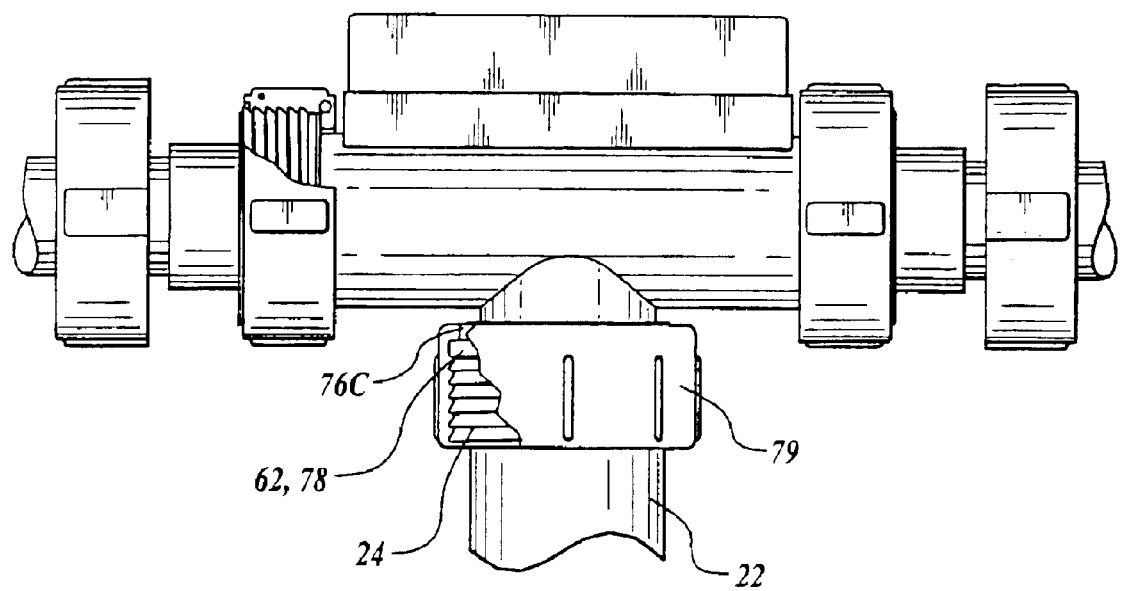
FIG. 12 is a cut-away view of a T-shaped fitting and pipe section, where the pipe section has been removed and replaced with a T-shaped close fit device and a split nut fastening assembly.

Referring to FIGS. 11–12, once the center segment 16 is removed, the T-shaped fitting and pipe section assembly 50 may accept a T-shaped close fit device 70 between the inlet and outlet portions 14A and 14B. The T-shaped close fit device 70 for use with the present invention includes a transverse aperture 74 between the inlet and outlet 34A and 34B. A transverse pipe branch 72 defining a port extends perpendicular to the close fit device main body 32 and is connected in fluid flow communication with the transverse aperture 74. The transverse pipe branch 72 includes a transverse flange 76. The close fit device 70 may be removably secured to the transverse tubing segment 22 by close fit transverse fastening assembly 77. In one embodiment, fastening assembly 77 includes a union nut 79. The fastening assembly 77 preferably also includes an inner seal 78. The union nut 79 can be slidably retained about the transverse pipe branch 72 by the transverse flange 76. The union nut 79 may removably engage the close fit device 70 to the tubing 22 by rotatably sealing fitting 24 to the transverse pipe branch 72. Additionally, an inner seal 78 may be provided that is captured between the fitting 24 and the transverse pipe branch 72. Installation is completed with the fitting and pipe section 50 being secured to the close fit device 70 in the same manner as in the first embodiment.

Figure 13:
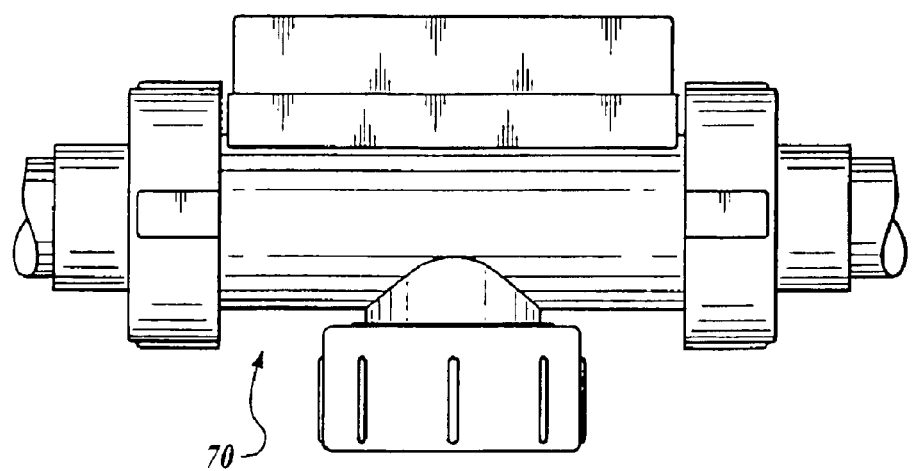
FIG. 13 is a perspective view of a T-shaped fitting and pipe section, where the pipe section has been removed and replaced with a T-shaped close fit device and a split nut fastening assembly.

Referring to FIG. 13, the T-shaped fitting and pipe section 50 is shown with a T-shaped close fit device 70 fully installed and in fluid flow communication with the tubing 20A, 20B, and 22 of a jetted bath.

In the second embodiment described above, the transverse pipe branch 52 and close fit transverse pipe branch 72 are shown as being centered along the fitting and pipe assembly 50 and close fit device 70, respectively. In another embodiment, transverse pipe branch 52 and close fit transverse pipe branch 72 may be positioned off center.

In another embodiment, the center segment 16 may be removably attached to the inlet and outlet portions 14A and 14B of pipe section 12. In this alternative embodiment, indicia 17A and 17B are not included, because cutting the fitting and pipe section 10 would be unnecessary. In this embodiment, the center segment could include flanges at its outlet and inlet ends, and could be removably attached to fittings 18A and 18B by fastening assembly 40A and 40B.

In an alternative embodiment, the indicia 17A and 17B may include visual guides, including but not limited to, paint. This is not preferred, since it is advantageous to physically guide the cutting device to assist in ensuring an acceptable cut.

While the preferred embodiment of the invention has been illustrated and described, it will be appreciated that various changes can be made therein without departing from the spirit and scope of the invention.

A pipe section 112 of a fitting and pipe section assembly 110 constructed in accordance with one embodiment of the present invention is shown in FIG. 14. The pipe section 112 is suitable for installation in an existing tubing network into which water may be drawn, treated, and then reintroduced into a jetted bath. The pipe section 112 makes it possible to modify previously constructed and/or installed jetted baths to accept a "close fit device," which is intended to mean a heater, having a predetermined length, for raising or maintaining bath water temperature.

The pipe section 112 has opposite end fittings 118A and 118B spaced by a center segment 116 of piping. The center segment 116 suitably includes annular grooves 117A and 117B. The end fittings 118A and 118B are disposed on inlet and outlet portions 114A and 114B of the pipe section 112, respectively. In the illustrated embodiment, the center segment 116 and the end fittings 118A and 118B are integrally formed to one another, thereby forming a pipe section 112 having a unitary body.

The end fittings 118A and 118B are integrally formed with pipe section 112 and may be of any suitable rigid material, such as PVC. However, it should be apparent to one skilled in the art that the end fittings 118A and 118B may be non-integral and coupled to the center segment by any suitable means, such as by mechanical fastening or adhering the end fittings 118A and 118B to the pipe section 112.

The grooves 117A and 117B on the pipe section 112 define the outer limits of the center segment 116 and guide the post-installation cutting of the pipe section 112 at predetermined locations. In alternate embodiments, other indicia are provided to guide the post-installation cutting of the pipe section 112. In one embodiment, the indicia include annular lips that protrude radially outward from the outer surface of the center segment 116. The annular lip locates and guides the post installation cutting of the center segment 116. In yet another embodiment, the indicia include visual markings to aid in the location of the post-installation cutting of the center segment 116, such as but not limited to, painted markings.

In fluid continuity with and partially nested within the end fittings 118A and 118B are sections of inlet and outlet tubing 120A and 120B. For descriptive purposes, the pipe section 112 will be described as installed in fluid continuity with tubing 120A and 120B of a jetted bath. The pipe section 112 may be coupled to the tubing 120A and 120B by any suitable means, such as by bonding agents (adhesives) or mechanical means, such as threaded fasteners. Although FIG. 14 shows tubing 120A and 120B secured inside of the pipe section 112, it will be understood that the pipe section 112 may be sized so that the tubing 120A and 120B may be secured on the outer surface of the pipe section 112.

To remove the center segment 116, the pipe section 112 may be cut along the grooves 117A and 117B. The grooves act as both a visual indicator for where to cut the pipe section 112 and to physically guide and center a cutting device (not shown). In a preferred embodiment, the cutting device is a cable saw threaded through a polymeric tubing with its ends connected by swaging, wire, or polymeric tie, which is automatically centered within the grooves 117A and 117B during cutting. Although the preferred embodiment utilizes a cable saw, it should be apparent to one skilled in the art that other cutting devices may suitably be used, such as a bladed cutting device. Further, the cutting device may be packaged separately, or with the close fit device or the fitting and pipe section assembly 110.

After the cutting device has fully cut the pipe section 112 along both grooves 117A and 117B, the center segment 116 may be removed in a direction normal to the length of the pipe section 112 without any longitudinal or lateral displacement of the remaining end fittings 118A and 118B. The resulting structure after removal of the center segment 116 is depicted in FIG. 15. The structure includes the end fitting 118A and 118B adhered to the tubing of a jetted bath. As should be apparent to one skilled in the art, the grooves 117A and 117B ensure that there is a predetermined distance separating the two end fittings 118A and 118B and that the cut surfaces of the two end fittings 118A and 118B are straight and plumb.

Still referring to the embodiment of FIGS. 14 and 15, the grooves 117A and 1178 are not located flush with the end fittings 118A and 118B. Instead, the grooves 117A and 1178 are suitably spaced a predetermined distance inward from the end fittings 118A and 118B. As a non-limiting example, the grooves 117A and 117B may be equally spaced a distance equal to the thickness of the outer seals 149A and 149B from the end fittings 118A and 118B, respectively. Also within the scope are grooves 117A and 117B spaced unequal distances from the end fittings 118A and 118B.

Figure 22A:
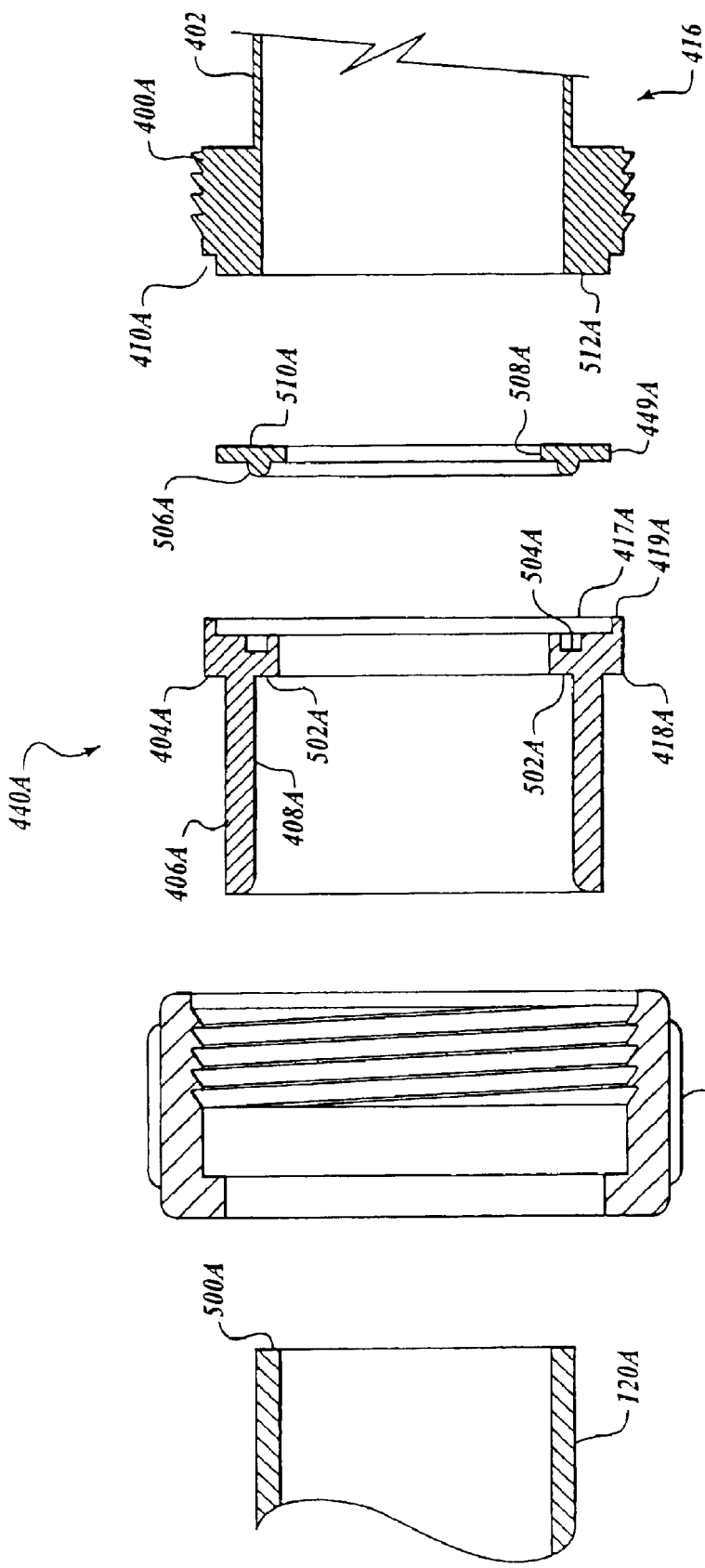
FIG. 22A is an exploded cross-sectional view of a center segment formed in accordance with one embodiment of the present invention, showing a first end of the center segment, an end fitting, and further showing a fastening assembly for releasably and sealingly connecting the center segment to the end fitting.

Selecting the location of the grooves 117A and 117B in this manner results in the formation of fitting lips 119A and 119B after the center segment 116 is removed. Referring now to FIGS. 16A–17B, the fitting lips 119A and 119B may have an outer diameter substantially equal with the diameter of a centrally located aperture 230A and 230B in outer seals 149A and 149B. The outer seals 149A and 149B may then be mounted (see FIG. 17A) on the fitting lips 119A and 119B to assist in aligning and retaining the outer seals 149A and 149B in place on the end fittings 118A and 118B during assembly. Alternatively, outer seals 149A and 149B may include raised portions which can be inserted into corresponding recesses in the vertical faces of fittings 118A and 118B to hold outer seals 149A and 149B in place, as depicted in FIGS. 22A and 29B.

In addition to the fitting lips 119A and 119B, the cylindrically-shaped end fittings 118A and 118B each includes a threaded portion 102A and 102B, an annular flange 104A and 104B, and a cylindrical cavity 106A and 106B. The threaded portion 102A and 102B is constructed with external threads sized and dimensioned to communicate with the internal threads of a retaining ring 190A and 190B, as discussed in greater detail below. The annular flange 104A and 104B extends radially outward from the end fittings 118A and 118B. The vertical surfaces of the annular ring create an inner mating surface 193A and 193B and an opposite outer mating surface 194A and 194B.

With the center segment 116 removed, the fitting and pipe section assembly 110 is now ready to receive a close fit device 130. The close fit device 130 is received between the end fittings 118A and 118B, which, as discussed above, are separated by a predetermined distance. The predetermined distance 135 is substantially equal to the length of the close fit device 130. In certain embodiments, the predetermined distance 135 may or may not include the thickness of outer seals 149A and 149B.

Figure 27:
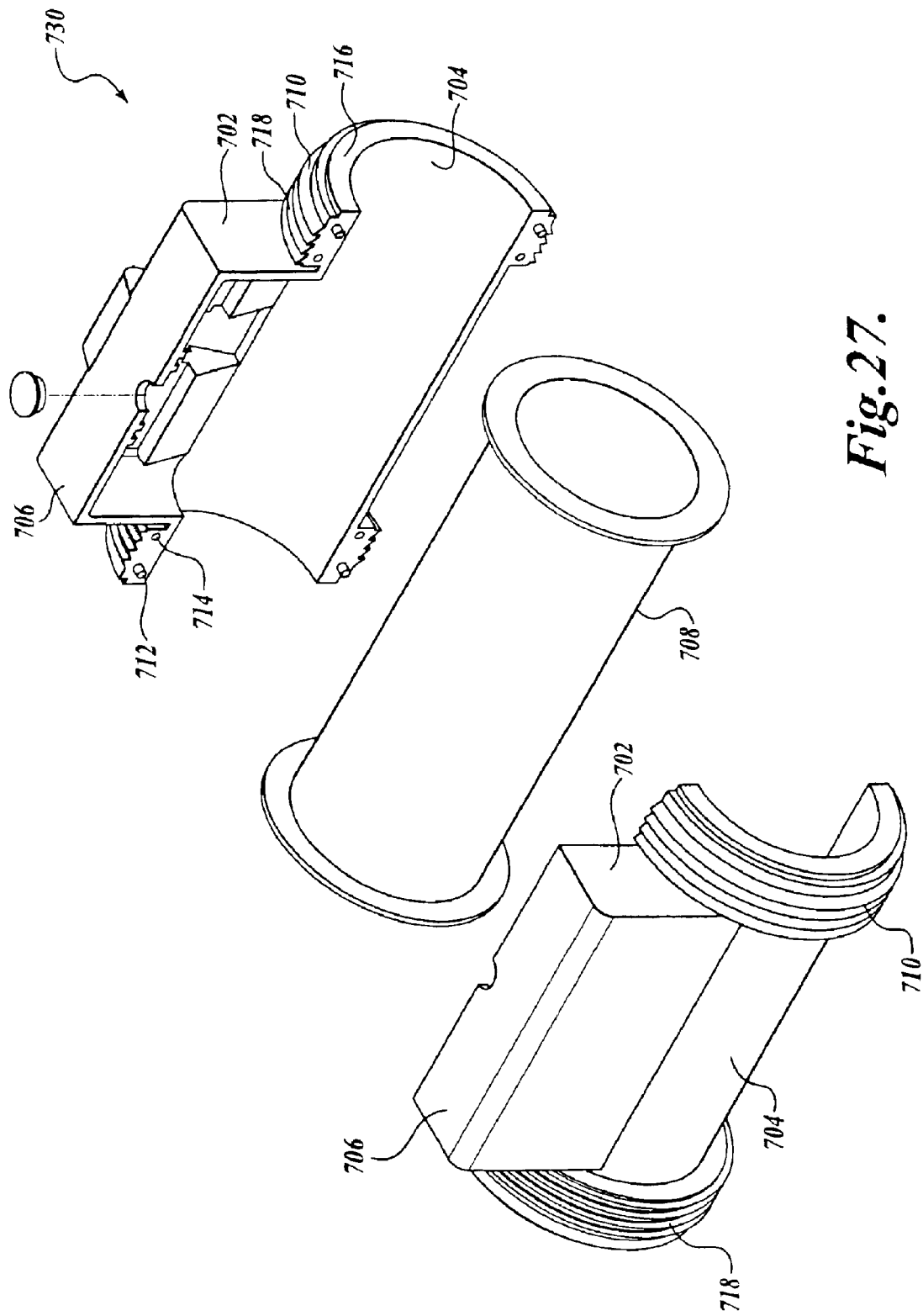
FIG. 27 is an exploded perspective view of a first and a second half of a split housing and the pipe section the halves encircle, formed in accordance with one embodiment of the present invention.

Since the length of the close fit device 130 substantially equals the predetermined distance, the close fit device 130 may be installed and/or removed without substantial longitudinal displacement of the end fittings 118A and 118B. A close fit device 130 may include, but is not limited to, a heater that includes fastening structures as in the embodiments described herein, or that includes alternate fastening assemblies that allow close fit installation. For example, a split two-piece heater housing with integral threads or flanges may be suitably used, as shown in FIG. 27. Further yet, a two-piece nut and split retaining ring assembly, such as is disclosed in U.S. Pat. No. 5,775,743 to Rochelle (the disclosure of which is hereby expressly incorporated by reference), or other constructions may also be suitably used in accordance with scope of this invention.

Figure 16A:
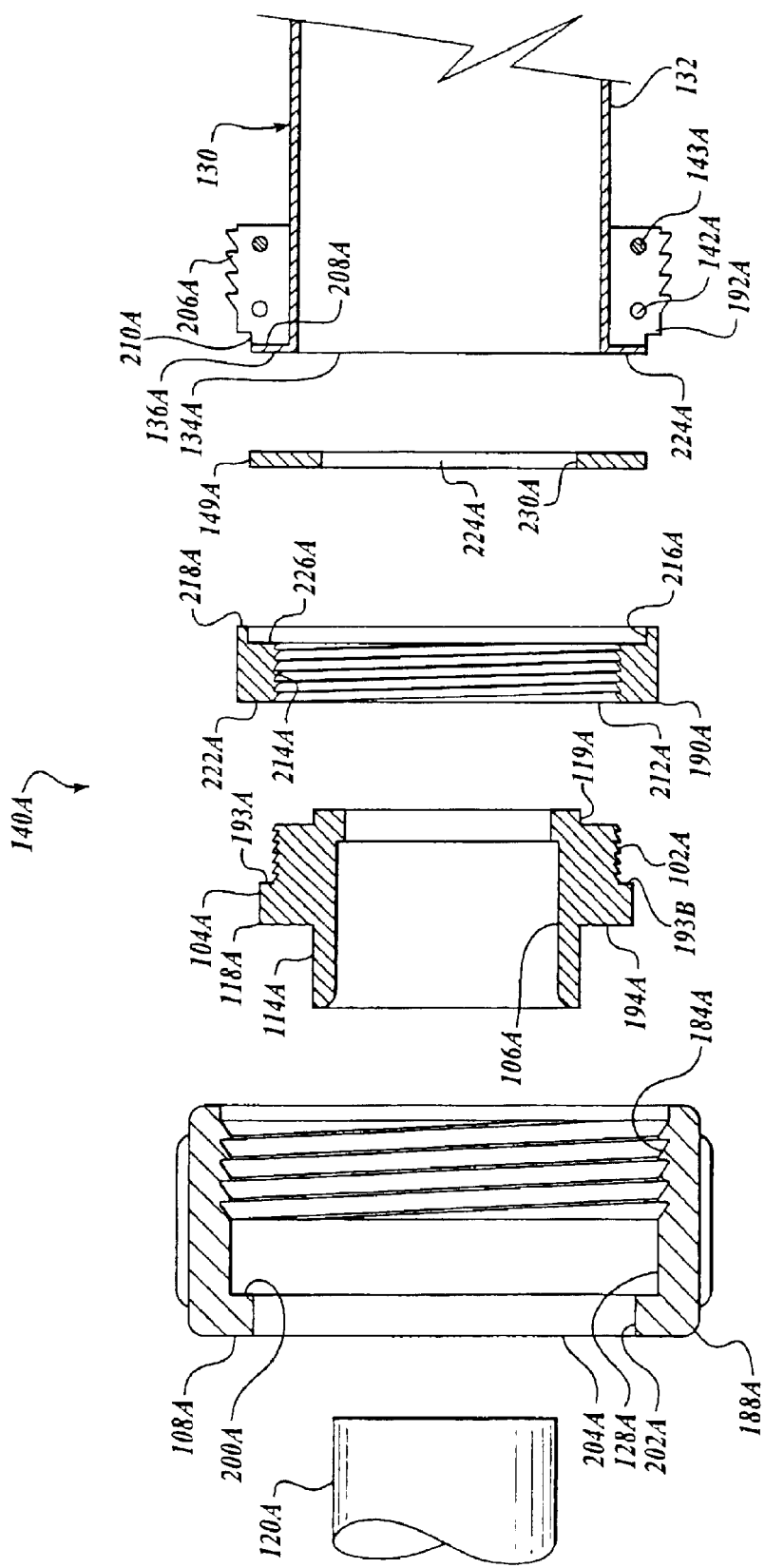
FIG. 16A is an exploded cross-sectional view of a first end of the pipe section shown in FIG. 14, where the center segment has been removed and replaced with a close fit device, and further showing a fastening assembly for releasably and sealing connecting the close fit device to the pipe section.
Figure 16B:
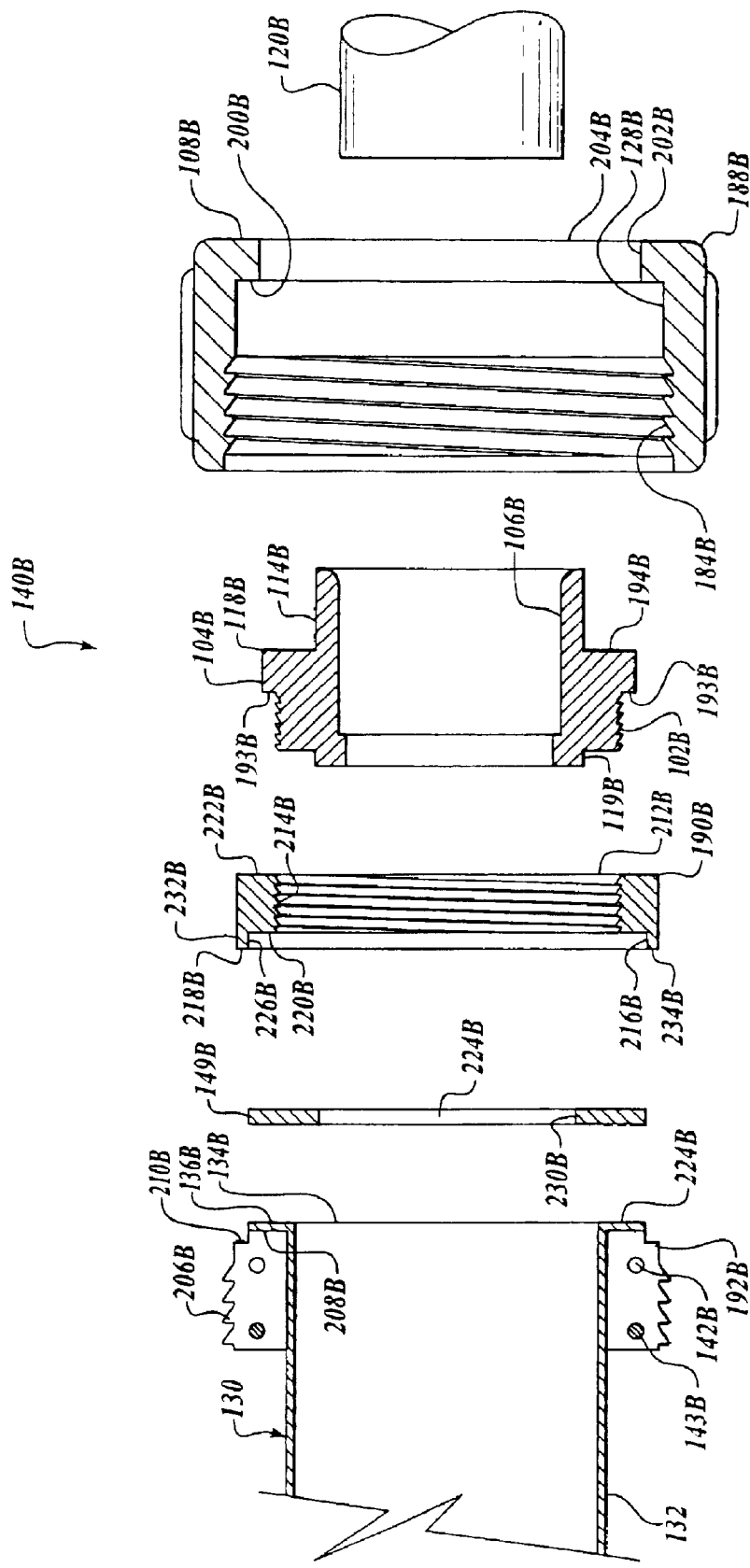
FIG. 16B is an exploded cross-sectional view of a second end of the pipe section shown in FIG. 16A, where the center segment has been removed and replaced with a close fit device and further showing a fastening assembly for releasably and sealingly connecting the close fit device to the pipe section.

As seen best by referring to FIGS. 16A and 16B, the close fit device 130 includes a main body 132 and an inlet and outlet 134A and 134B located at the ends of the main body 132 for fluid flow communication with the jetted bath tubing 120A and 120B. The close fit device 130 also includes integrally formed flanges 136A and 136B.

Still referring to FIGS. 16A and 16B, the close fit device 130 may be removably secured to the end fittings 118A and 118B by first and second fastening assemblies 140A and 140B. In the illustrated embodiment, the elements of the two fastening assemblies 140A and 140B are substantially identical to one another. Where context permits, reference in the following description to an element of one of the fastening assemblies 140A and 140B shall be understood as also referring to the corresponding element in the other assembly.

The fastening assembly 140A includes a nut 188A, a retaining ring 190A, and a threaded fastener 192A. The fastening assembly 140A also includes an outer seal 149A. The nut 188A has a cavity 128A and an annular mating flange 108A. The cavity 128A is generally cylindrical in shape and contains an internal threaded portion 184A having threads dimensioned to mate with external threads 206A of the threaded fastener 192A.

The annular mating flange 108A extends radially inward within the cavity 128A. One of the vertical surfaces of the annular mating flange 108A creates an inner mating surface 200A (suitably facing toward the threaded portion 184A). The edge surface 202A of the annular mating flange 108A defines an aperture 204A sized and dimensioned to allow the passage of the end fitting 118A therethrough, but having a diameter insufficient to allow the passage of the retaining ring 190A therethrough.

The retaining ring 190A is generally a ring-shaped member having a cavity 212A with an internally threaded portion 214A sized and configured to mate with the external threads 102A of the end fitting 118A. The retaining ring 190A also includes a gasket receiving recess 216A sized and dimensioned to receive the outer seal 149A. An annular extension 218A is integrally formed within one end of the retaining ring 190A.

The threaded fastener 192A is preferably a two-piece, ring-shaped member and includes an externally threaded portion 206A, locking pins 143A, locking apertures 142A, a flange mating surface 208A, and an annular recess 210A. The threaded portion 206A has external threads sized and dimensioned to communicate with the internal threads 214A of the nut 188A. The locking pins 143A and locking apertures 142A are located along the surfaces dividing the two pieces of the threaded fastener 192A. The two halves of the threaded fastener 192A may be selectively secured together by engaging the locking pins 143A and locking apertures 142A of one half, with the corresponding structures of the other half, in a manner substantially similar to that described above for the two-piece split nut 41A shown in FIG. 5.

In light of the above description of the structures, the detachable connection of the close fit device 130 in fluid flow communication with the end fittings 118A and 118B will now be described. The center segment 116 (see FIG. 14) is cut and removed as described above, leaving a longitudinal gap 135 of a predetermined distance between the two end fittings 118A and 118B. Inasmuch as the diameter of the aperture 204A in the nut 188A is greater than the diameter of the annular flange 104A of the end fitting 118A, the nut 188A may be slid (with the threaded portion 184A facing the longitudinal gap) past the end fitting 118A. The retaining ring 190A is then threaded onto to the end fitting 118A until a vertical mating surface 222A of the retaining ring 190A engages the inner mating surface 193A of the annular flange 104A of the end fitting 118A, as shown in FIG. 17A.

The outer seal 149A may then be inserted within the gasket receiving recess 216A of the retaining ring 190A so that the fitting lip 119A extends within the center aperture 224A of the outer seal 149A, releasably mounting the outer seal 149A within the recess 216A.

The separate halves of the split threaded fastener 192A are separated and placed around the main body 132 of the close fit device 130. The locking pins 143A and locking apertures 142A, located along the surfaces dividing the two pieces of the split threaded fastener 192A, of one half of the split threaded fastener 192A, are aligned with the corresponding structures of the opposing half and inserted within each other to removably secure the two halves together.

Figure 17A:
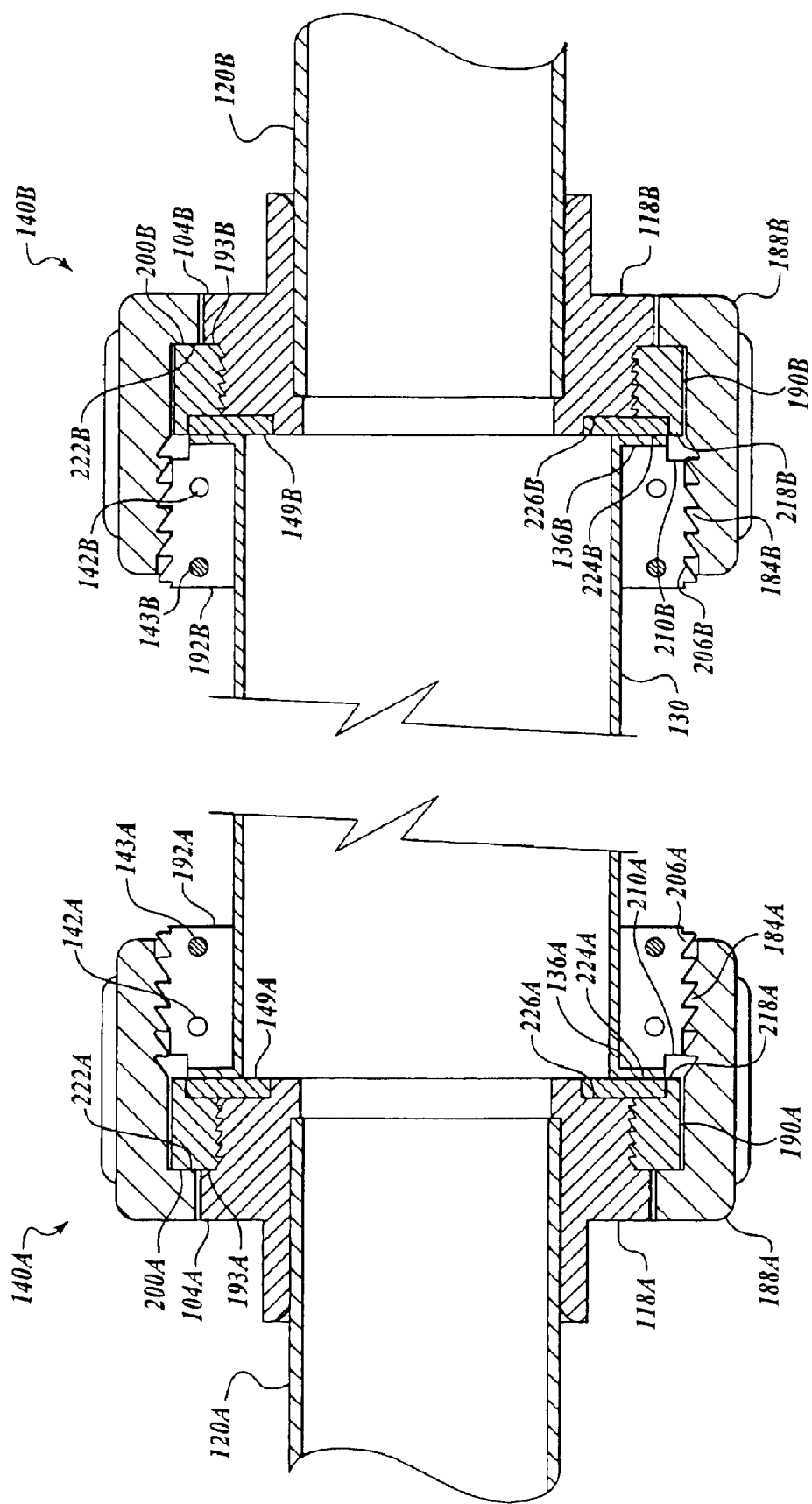
FIG. 17A is a cross-sectional view of the pipe section of FIG. 14, where the center segment has been removed and replaced with a close fit device and further showing a fastening assembly loosely connecting the close fit device to the pipe section.
Figure 17B:
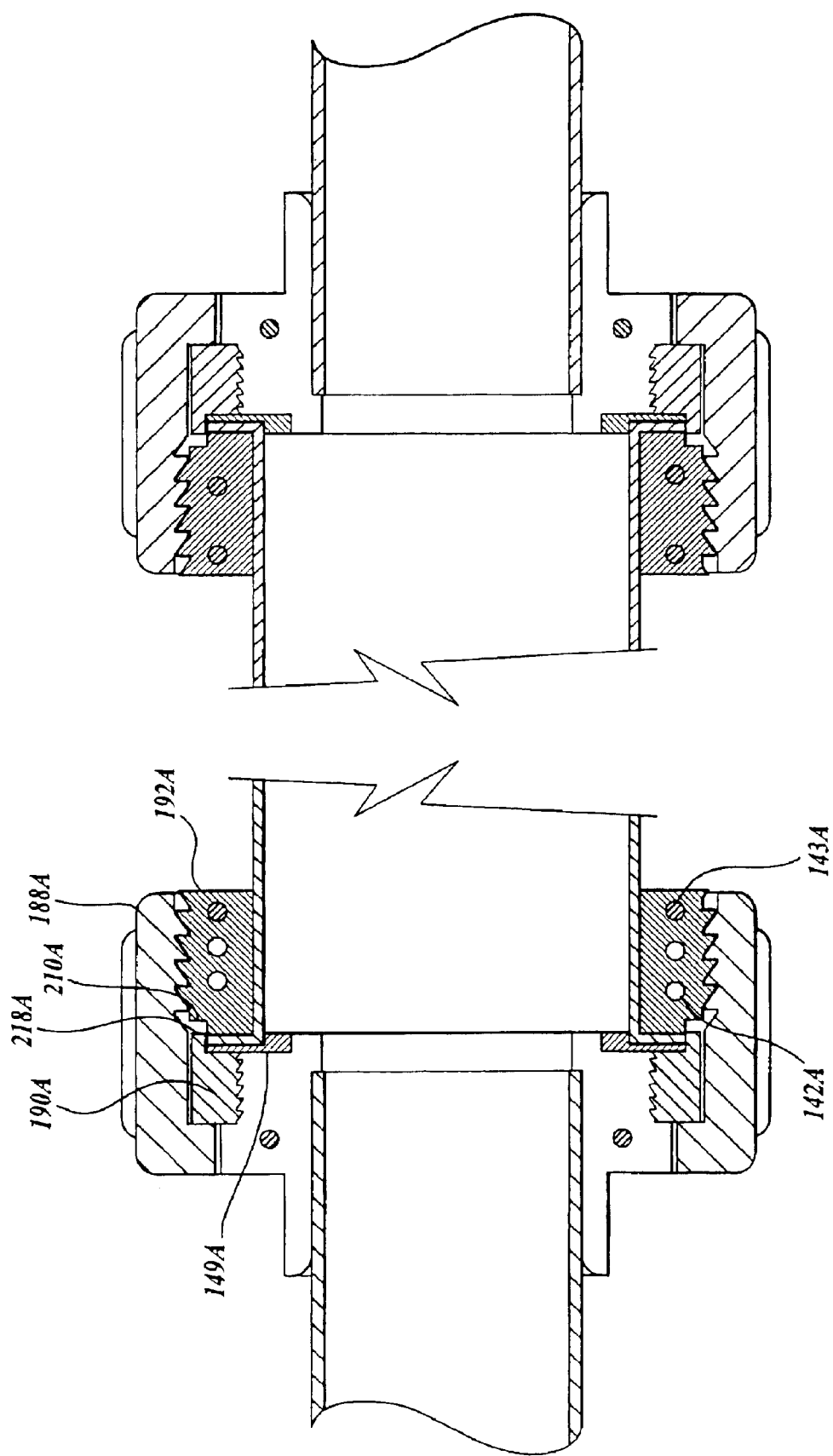
FIG. 17B is a cross-sectional view of the Pipe section of FIG. 17A, wherein the fastening assembly is shown in a fully fastened configuration such that an extension of the fastening assembly extends past an imaginary plane coplanar with a substantially planar sealing surface of the close fit device.

Referring now to FIG. 17A, with the parts arranged as such, the close fit device 130 may be slid between the end fittings 118A and 118B. The one-piece nut 188A is slid forward and rotated so that the internal threads 184A engage the external threads 206A of the split-threaded fastener 192A. As the one-piece nut 188A is further rotated, the inner mating surface 200A of the one-piece nut 188A engages the vertical mating surface 222A of the retaining ring 190A. As the one-piece nut 188A is rotated even further, the outer seal 149A contacts an outer surface 224A of the flange 136A of the close fit device 130, and a compression surface 226A of the retaining nut 190A, as shown in FIG. 17A. With the one-piece nut 188A fully tightened as shown in FIG. 17B, beyond the initial contact, semi-loose configuration shown in FIG. 17A the annular extension 218A of the retaining ring 190A may be received within the annular recess 210A of the split threaded fastener 192A as the outer seal 149A is compressed. Further, with the one-piece nut 188A fully tightened, the separate halves of the split threaded fastener 192A are held together, thus preventing the locking pins 143A and 143B and locking apertures 142A and 142B of one half of the split threaded fastener 192A from disengaging from the corresponding locking pins and apertures (not shown) of the other half of the split threaded fastener 192A.

Referring to FIG. 17A, the end fittings 118A and 118B are shown with a close fit device 130 installed therebetween and in fluid flow communication with the tubing 120A and 120B of a jetted bath. It will be understood that the fastening assemblies 140A and 140B are not limited to those embodiments described herein, but also encompass any fastener or fastener assemblies capable of securing any close fit device to any end fittings 118A and 118B. For example, fastening assemblies with or without outer seals 149, fitting lips 119, and annular extensions 218, are suitably used and are within the scope of the present invention.

Referring to FIG. 18, an alternative embodiment of the pipe section 112 of FIG. 14 is shown. The alternate embodiment of the pipe section 312 illustrated in FIG. 18 is similar but not identical to the pipe section of FIG. 14. Inasmuch as the installation on the inlet and outlet tubing 320A and 320B, including the cutting along indicia 317A and 317B, is substantially identical to that of the pipe section 112 of FIG. 14, the disclosure referencing the embodiment shown in FIG. 14 is hereby expressly incorporated by reference where the context permits.

Referring to the embodiment depicted in FIG. 18, in comparison to the embodiment depicted in FIG. 14, several differences should be apparent to one skilled in the art. For instance, the embodiment depicted in FIG. 18 has end fittings 318A and 318B of a different configuration. For example, as is apparent in comparing the embodiments, the pipe section of FIG. 18 lacks the annular flange 104A and 104B of the embodiment shown in FIG. 14. Further, the threaded portions 302A and 302B of the end fittings 318A and 318B are of a greater diameter. Further yet, positioned between the fitting lips 119A and 119B and the threaded portions 302A and 302B is a circular-shaped raised gasket mating surface 326A and 326B having a diameter substantially equal to that of the outer seals 349A and 349B (see FIG. 20).

Referring to FIGS. 18 and 19, the center segment 316 is removed from the pipe section 312 of FIG. 18 by cutting at the grooves 317A and 317B, as disclosed above and hereby expressly incorporated by reference. After removal of the center segment 316, opposing end fittings 318A and 318B remain spaced at a predetermined distance and coupled to the inlet and outlet tubing 320A and 320B, as shown in FIG. 19.

Figure 20:
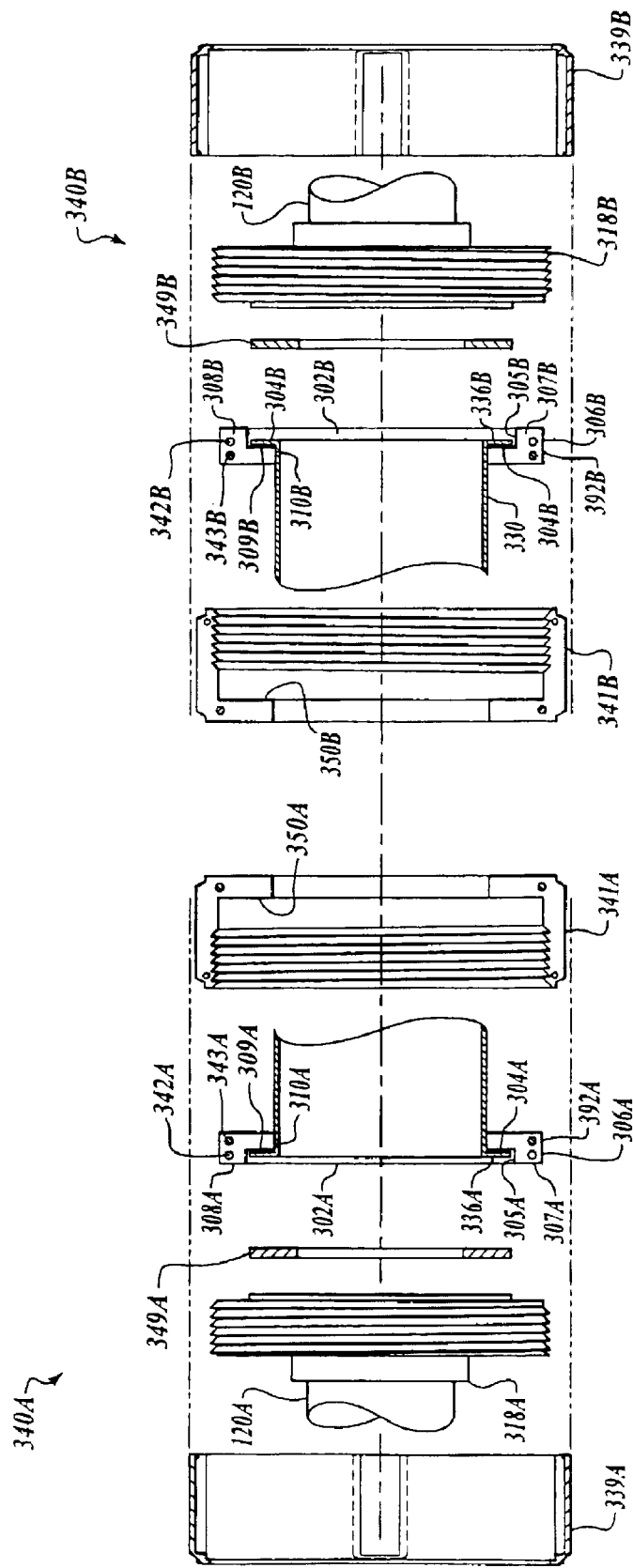
FIG. 20 is an exploded sectional view of the pipe section of FIG. 18 where the center segment has been removed and replaced with a close fit device, and further showing a fastening assembly for releasably and sealingly connecting the close fit device to the pipe section.

Referring now to FIG. 20, the description of a pair of fastening assemblies 340A and 340B used to couple the end fittings 318A and 318B to a close fit device 330, once the center segment is removed, will now be described. In the illustrated embodiment, the elements of the two fastening assemblies 340A and 340B are substantially identical to one another. Where context permits, reference in the following description to an element of one of the fastening assemblies 340A and 340B shall be understood as also referring to the corresponding element in the other assembly. The fastening assemblies 340A and 340B include a pair of two-piece split nuts 341A and 341B and split nut covers 339A and 339B of similar design and construction of those illustrated in FIG. 5, the description of which is hereby expressly incorporated by reference. The fastening assemblies 340A and 340B further include a pair of outer seals 349A and 349B of similar design and construction to those illustrated in FIGS. 16A and 16B, the description of which is also hereby expressly incorporated by reference.

The fastening assemblies 340A and 340B further include a pair of split flanges 392A and 392B. The split flanges 392A and 392B are generally ring-shaped members split by an imaginary plane containing the centerline of the end fittings 318A and 318B, bisecting the ring into a first and a second half. The split flanges 392A and 392B each has a circular-shaped recess 302A and 302B sized and dimensioned to receive a flange 336A or 336B of the close fit device 330 and an outer seal 349A and 349B therewithin. The outer wall of the circular shaped recess 302A defines a first wall 305A of the annular extension 308A, further defined by a parallel second wall 306A, and a perpendicular end surface 307A.

The split flange 392A further includes locking pins 343A, locking apertures 342A, a flange mating surface 309A, and an aperture 310A. The locking pins 343A and locking apertures 342A are located along the surface dividing the two pieces of the split flange 392A. The two pieces of the split flange 392A may be removably secured together by locking pins 343A engaging locking apertures 342A. The flange mating surface 309A engages the inner surface 304A of the flange 336A of the close fit device 330 when the fastening assemblies 340A and 340B are fully tightened. The aperture 310A is of a diameter substantially equal to or slightly greater than the outer diameter of the close fit device 330. Thus, the aperture 310 allows the split flange 392A to be secured as a continuous ring encircling the close fit device 330 by the locking pins 343A and locking apertures 342A.

Figure 21A:
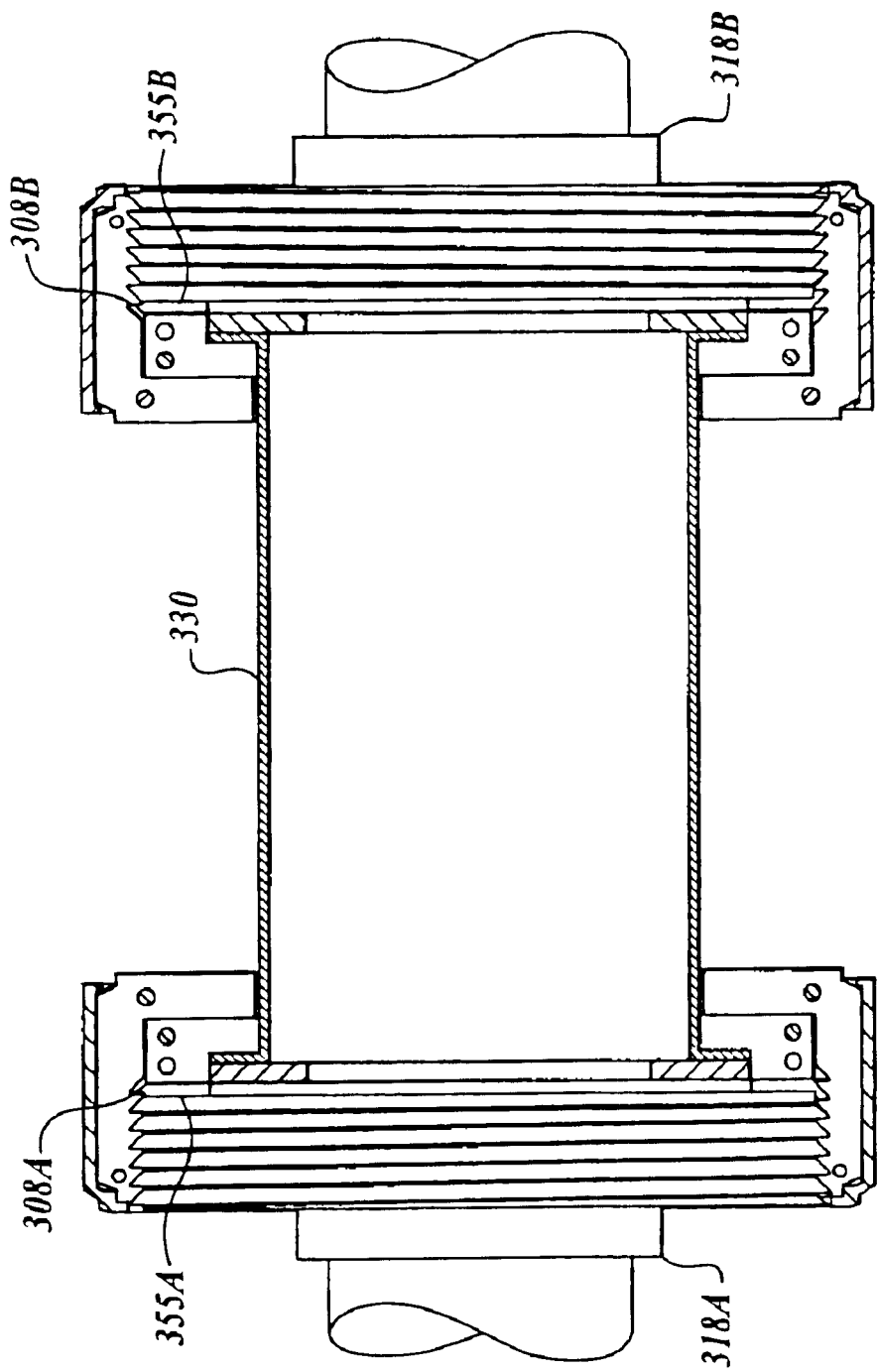
FIG. 21A is a cross-sectional view of the pipe section of FIG. 18 where the center segment has been removed and replaced with the close fit device, and further showing the fastening assembly loosely connecting the close fit device to the pipe section.
Figure 21B:
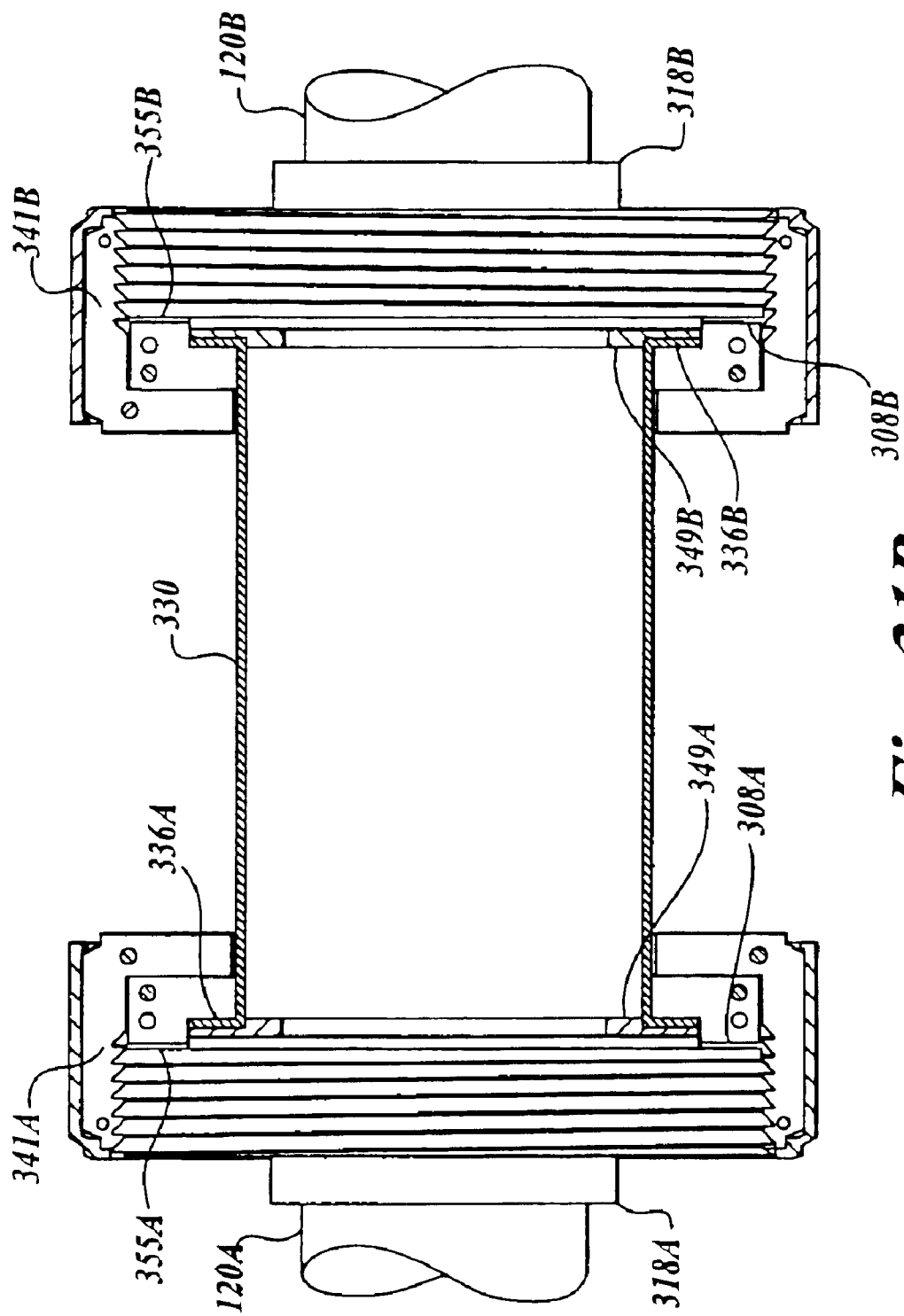
FIG. 21B is a cross-sectional view of the pipe section, close fit device, and fastening assembly of FIG. 21A, wherein the fastening assembly is shown in a fully fastened configuration such that an extension of the fastening assembly extends past an imaginary plane coplanar with a substantially planar sealing surface of the close fit device.

Still referring now to FIG. 20, in light of the above description of the structures, the removably sealing of the close fit device 330 in fluid flow communication with the end fittings 318A and 318B will now be described. The center segment is cut and removed as described above, leaving a longitudinal gap between the two end fittings 318A and 318B ready to accept a close fitting device 330. The split flanges 392A and 392B are secured as a continuous ring encircling the close fit device 330 by the locking pins 343A and 343B and locking apertures 342A and 342B with the annular extensions 308A and 308B facing outward toward the flanges 336A and 336B of the close fit device 330. The split nuts 341A and 341B are secured as a continuous ring encircling the close fit device 330 by the locking pins 343A and 343B and locking apertures 342A and 342B, with the threaded portion extending outward toward the end fittings 318A and 318B. The close fit device 330 is then slid transversely between the end fittings 318A and 318B and aligned so that the centerline of the end fittings 318A and 318B is co-linear with the centerline of the close fit device 330. The split nuts 341A and 341B and split flanges 392A and 392B are then moved longitudinally outward from the midsection of the close fit device 330 until the threads of the split nut 341A and 341B engage the threads of the end fittings 318A and 318B. As the split nuts 341A and 341B are rotated, the mating surfaces 350A and 350B of the split nuts 341A and 341B contact the split flanges 392A and 392B, driving the split flanges 392A and 392B outward until the mating surfaces 309A and 309B of the split flanges 392A and 392B contact the inner walls 304A and 304B of the flanges 336A and 336B, as shown in FIG. 21A. Referring now to FIG. 21B, as the split nuts 341A and 341B are rotated further yet, beyond the initial contact, semi-loose configuration shown in FIG. 21A, the end fittings 318A and 318B are pulled slightly toward the midsection of the close fit device 330, thereby compressing the outer seals 349A and 349B between the flanges 336A and 336B and the end fittings 318A and 318B, removably sealing the close fit device 330 in fluid communication with the end fittings 318A and 318B and inlet and outlet tubing 120A and 120B. Further, as the outer seals 349A and 349B are compressed, the annular extensions 308A and 308B are received within an annular recessed portion 355A and 355B in the end fittings 318A and 318B.

Figure 22B:
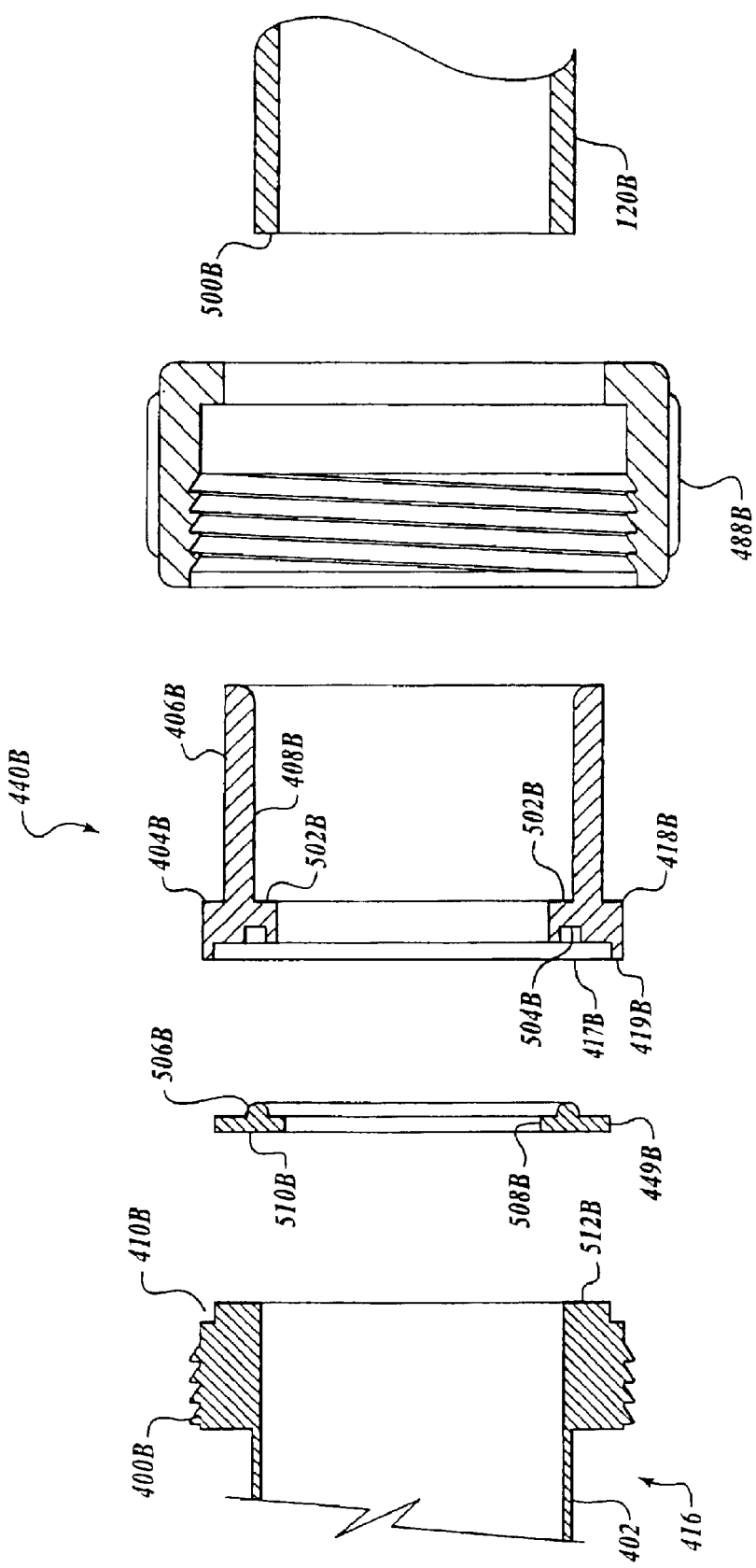
FIG. 22B is an exploded cross-sectional view of the second end of the center segment shown in FIG. 22A, further showing an end fitting and a fastening assembly for releasably and sealingly connecting the center segment to the end fitting.
Figure 23:
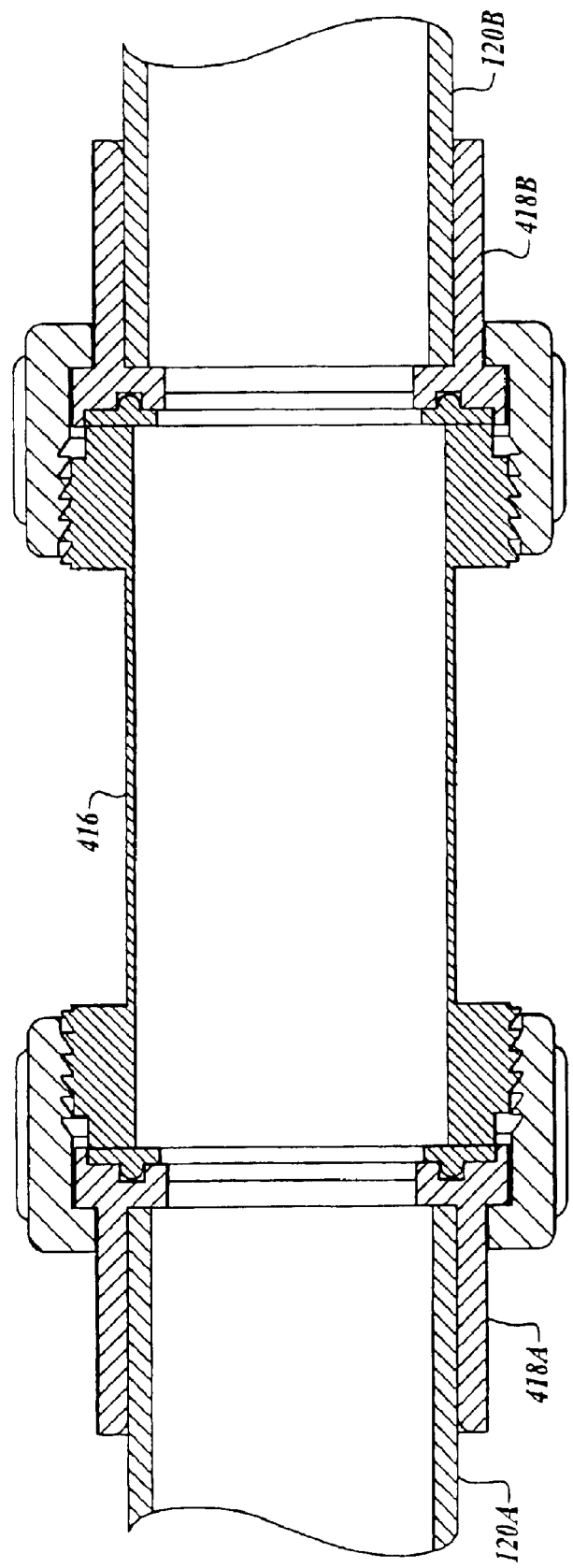
FIG. 23 is a cross-sectional view of the pipe section shown in FIGS. 22A and 22B, showing the fastening assemblies removably and sealingly connecting the center segment to the end fittings.

Referring to FIGS. 22A, 22B, and 23, in another embodiment of the present invention, a center segment 416 having integral threaded fittings 400A and 400B is disclosed. The center segment 416 may be removably attached to a pair of opposing end fittings 418A and 418B, which, in turn, are attached to the inlet and outlet tubing 120A and 120B. In this embodiment, in lieu of cutting the center segment for removal, the center segment 416 of this embodiment is unfastened. For example, the center segment 416 may be removably attached to end fittings 418A and 418B by fastening assemblies 440A and 440B. Thus, removal is accomplished by simply unthreading the center segment 416 and sliding the center segment normal to the longitudinal length of the center segment 416. A close fit device—for example, one with heating elements for heating a fluid which passes therethrough—may then be installed in place of the removed center segment 416. In this embodiment, indicia are unnecessary since cutting the center segment 416 is not required.

The center segment 416 and the close fit device 430 of this embodiment are both of substantially similar lengths and have substantially similar means for coupling to the end fittings 418A and 418B, so that the center segment and close fit device are interchangeable. The close fit device 430 (see FIGS. 24A and 24B) and one-piece nuts 488A and 488B of the embodiment are substantially similar to the close fit device 130 and one-piece nuts 188A and 188B illustrated in FIGS. 16A and 16B. Therefore, the description of the close fit device 130 and one-piece nuts 188A and 188B depicted in FIGS. 16A and 16B will be understood as also referring to the close fit device 430 and one-piece nuts 488A and 488B of the embodiment of the present invention illustrated in FIGS. 22A, 22B, 23, 24A, 24B, 25A, and 25B.

Referring to FIGS. 22A and 22B, the center segment 416 of this embodiment includes a tubular main body 402. At each distal end of the main body 402 are threaded portions 400A and 400B. The threaded portions 400A and 400B have external threads sized and dimensioned to communicate with the internal threads of the one-piece nuts 488A and 488B. The threaded portions 400A and 400B also have an annular recess 410A and 410B circumferentially located on the threaded portions 400A and 400B. The annular recesses 410A and 410B are sized and dimensioned to receive an annular extension, which will be described in further detail below. In the illustrated embodiment, the threaded portions 400A and 400B are integrally formed with the center segment 416 and are of any suitable rigid material, such as PVC or steel. However, it should be apparent to one skilled in the art, that the threaded portions 400A and 400B may be non-integral and coupled to the center segment by any suitable means, such as by mechanically fastening the threads to the center segment 416 or using a split threaded fastener such as disclosed above in reference to FIGS. 16A and 16B in conjunction with a flanged center segment.

Referring to FIGS. 22A and 22B, a pair of end fittings 418A and 418B will now be disclosed. The end fittings 418A and 418B are coupled to and in fluid continuity with sections of the inlet and outlet tubing 120A and 120B. The tubing 120A and 120B is attached to the end fittings 418A and 418B by any suitable means; such as by bonding agents (adhesives) as would be used in the illustrated embodiment, by mechanical means, such as threaded fasteners, or by integrally forming the end fittings 418A and 418B with the tubing 120A and 120B. Although FIGS. 22A and 22B show the tubing 120A and 120B secured inside of the end fittings 418A and 418B, it will be understood that the end fittings 418A and 418B may be sized so that the tubing 120A and 120B may be secured on the outer surface of the end fittings 418A and 418B.

Generally described, the end fittings 418A and 418B are formed from a cylindrically-shaped main body 406A having an end flange 404A circumferentially located at one end. Inasmuch as end fittings are substantially identical in structure, the reference in the following description to an element of one end fitting 418A or 418B shall be understood as also referring to the corresponding element in the other end fitting. The cylindrically-shaped main body 406A defines a cylindrical cavity 408A sized and dimensioned to receive the outlet tubing 120A therewithin. During assembly, the outlet tubing 120A is coated with an adhesive and inserted within the cavity 408A of the end fitting 418A, preferably until the edge surface 500A contacts the inner wall of the flange 404A at location 502A. End fitting 418B is similarly mounted on the inlet tubing 120B so that the two end fittings 418A and 418B are longitudinally aligned and in an opposing orientation with a predetermined distance separating the two end fittings 418A and 418B.

The flange 404A of the end fitting 418A further includes a gasket receiving recess 417A and a groove 504A. The gasket receiving recess 417A is sized and dimensioned to receive the outer seal 449A. The depth of the gasket receiving recess 417A is substantially equal to the thickness of the outer seal 449A. The groove 504A is sized and dimensioned to receive an annular extension 506A of the outer seal 449A, to be described in further detail below. The depth of the groove 504A is preferably less than the height of the annular extension 506A of the outer seal 449A, so the annular extension 506A will be compressed within the groove 504A during assembly.

Referring to FIGS. 22A and 22B, a pair of fastening assemblies 440A and 440B used to couple the end fittings 418A and 418B to a center segment 416 will now be described. The fastening assemblies 440A and 440B include the pair of one-piece nuts 488A and 488B of substantially similar construction to the one-piece nuts 188A and 188B illustrated in FIGS. 16A and 16B. The fastening assemblies 440A and 440B further include a pair of outer seals 449A and 449B. The outer seals 449A and 449B each have a central aperture 508A and 508B defined by outer, generally flat, ring-shaped portions 510A and 510B. The central apertures 508A and 508B allow fluid to pass therethrough. The flat ring-shaped portions 510A and 510B contain annular extensions 506A and 506B extending longitudinally outward toward the end fittings 418A and 418B. The annular extensions 506A and 506B are sized and dimensioned to provide an interference fit within the annular grooves 504A and 504B of the end fittings 418A and 418B. The interference fit of the annular extension 506A within the annular groove 504A may hold the outer seals 349A and 349B in place during assembly. The outer seals 349A and 349B are formed from a compressible material able to provide a seal between the normal end surfaces 512A and 512B of the center segment 416 and the end normal surfaces of the gasket receiving recesses 417A and 417B of the end fittings 418A and 418B.

In light of the above description of the structures, the removably sealing of the center segment 416 in fluid flow communication with the end fittings 418A and 418B will now be described. The one-piece nuts 488A and 488B are slipped over the inlet and outlet tubing 120A and 120B. The end fittings 418A and 418B may then be coupled to the inlet and outlet tubing 120A and 120B. This is accomplished by inserting the ends of the tubing 120A and 120B within the cylindrical cavities 408A and 408B of the end fittings 418A and 418B, preferably until the end edge surfaces 500A and 500B contact the inner wall of the flanges 404A and 404B at locations 502A and 502B. They may be retained in this configuration by a bonding agent or any other suitable means. The two end fittings 418A and 418B are preferably now longitudinally aligned and in an opposing orientation with a predetermined distance separating the two end fittings 418A and 418B. The outer seals 449A and 449B are then inserted within the gasket receiving recesses 417A and 417B so that the annular extensions 506A and 506B of the outer seals 449A and 449B extend longitudinally outward and into the annular grooves 504A and 504B of the end fittings 418A and 418B. The interference fit of the annular extensions 506A and 506B within the annular grooves 500A and 500B may hold the outer seals 349A and 349B in place during assembly.

Figure 25A:
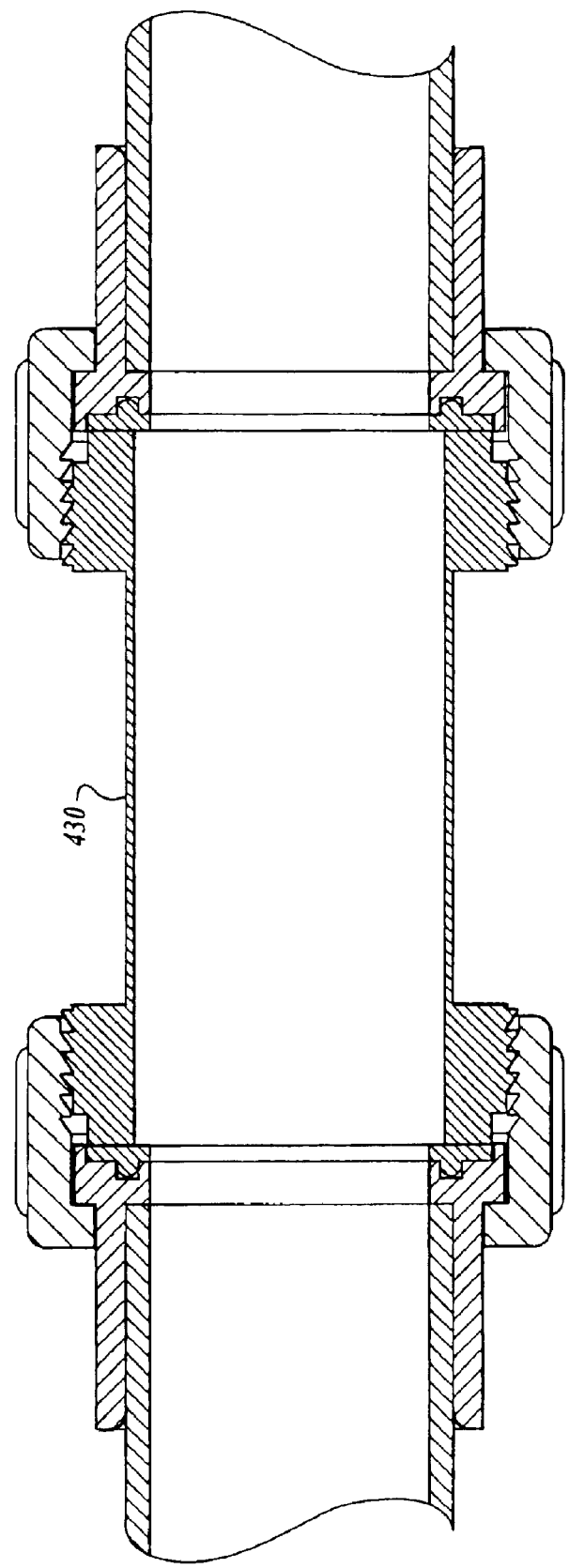
FIG. 25A is a cross-sectional view of the close fit device shown in FIGS. 24A and 24B, showing the fastening assemblies removably and loosely connecting the close fit device to the end fittings.
Figure 25B:
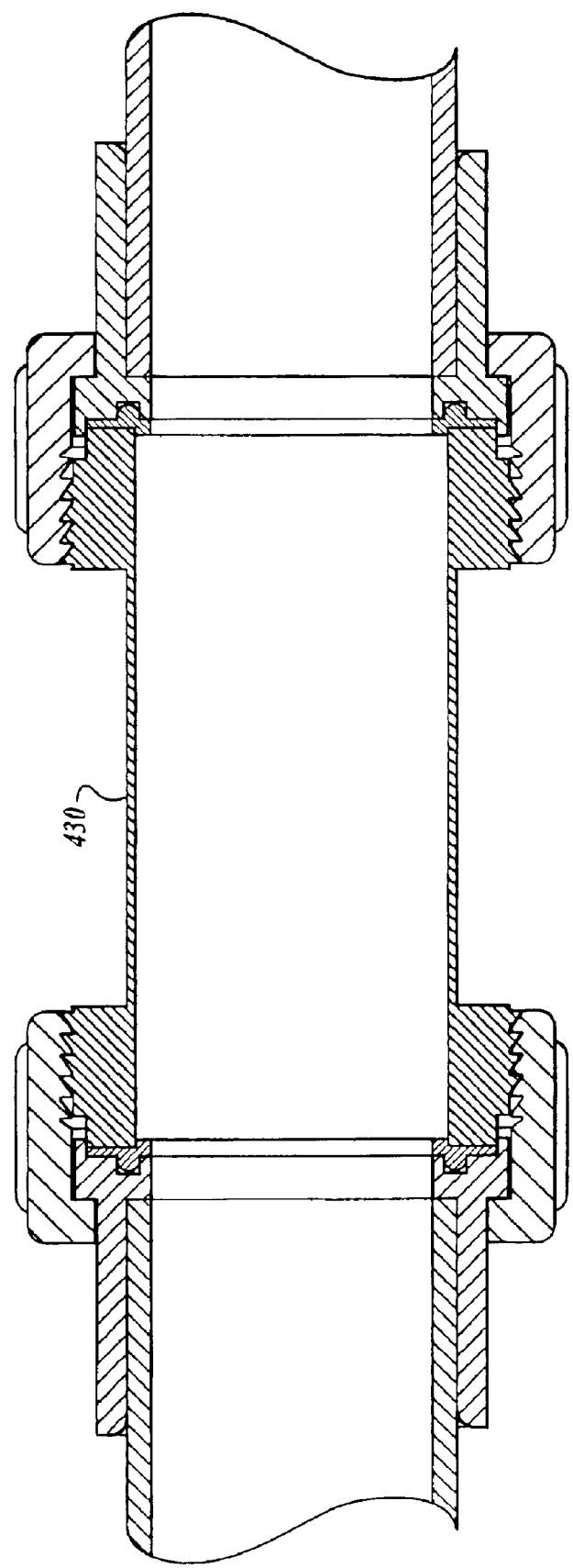
FIG. 25B is a cross-sectional view of the close fit device, fastening assemblies, and end fittings of FIG. 25A, wherein the fastening assemblies are shown in a fully fastened configuration such that extensions of the fastening assemblies extend past imaginary planes coplanar with substantially planar sealing surfaces of the close fit device.

The center segment 416 may then be slid transversely between the end fittings 418A and 418B and aligned so that the centerline of the end fittings 418A and 418B is co-linear with the centerline of the center segment 416. The one-piece nuts 418A and 418B may then be moved longitudinally inward toward the midsection of the center segment 416 until the internal threads of the one-piece nuts 488A and 488B engage the external threads 400A and 400B of the center segment 416. As the one-piece nuts 488A and 488B are rotated, the end fittings 418A and 418B are pulled toward the midsection of the center segment 416. This action compresses the outer seals 449A and 449B between the normal end surface 512A of the center segment 416 and the normal end surfaces of the gasket receiving recesses 417A and 417B of the end fittings 418A and 418B. With the one-piece nuts 488A and 488B fully tightened beyond the semi-tight configuration shown in FIG. 23, the annular extensions 419A and 419B of the end fittings 418A and 418B may be received within the annular recesses 410A and 410B of the threaded portions 400A and 400B as the outer seals 449A 449B are compressed further, as best shown in FIG. 25B, but with the close fit device 430 shown in lieu of the center segment 416. In this configuration, the center segment 416 is removably sealed in fluid communication with the end fittings 418A and 418B and the inlet and outlet tubing 120A and 120B, as shown in FIG. 23.

Referring to FIGS. 22A, 22B, and 23, it is apparent that the center segment 416 is removably attached to the end fittings 418A and 418B and thereby the inlet and outlet tubing 120A and 120B. In this embodiment, in lieu of cutting the center segment for removal, the center segment 416 of this embodiment is simply unfastened. For example, by rotating the one-piece nuts 488A and 488B, the end fittings 418A and 418B may be disengaged from the center segment 416. Thus, removal is accomplished by unthreading the center segment 416 and sliding the center segment 416 normal to the longitudinal length of the center segment 416.

Referring now to FIGS. 24A, 24B, 25A, and 25B, a close fit device 430—for example, one with beating elements for heating a fluid which passes therethrough—may then be installed in place of the removed center segment using the same fastening assemblies 440A and 440B. Installation and removal of the close fit device 430 is substantially similar as that described for the installation of the center segment. Therefore, the description of the installation and removal of the center segment 416 of FIGS. 22A, 22B and 23 will be understood as also referring to the installation and removal of the close fit device 430 of this embodiment, as illustrated in FIGS. 24A, 24B, 25A, and 25B.

Figure 26A:
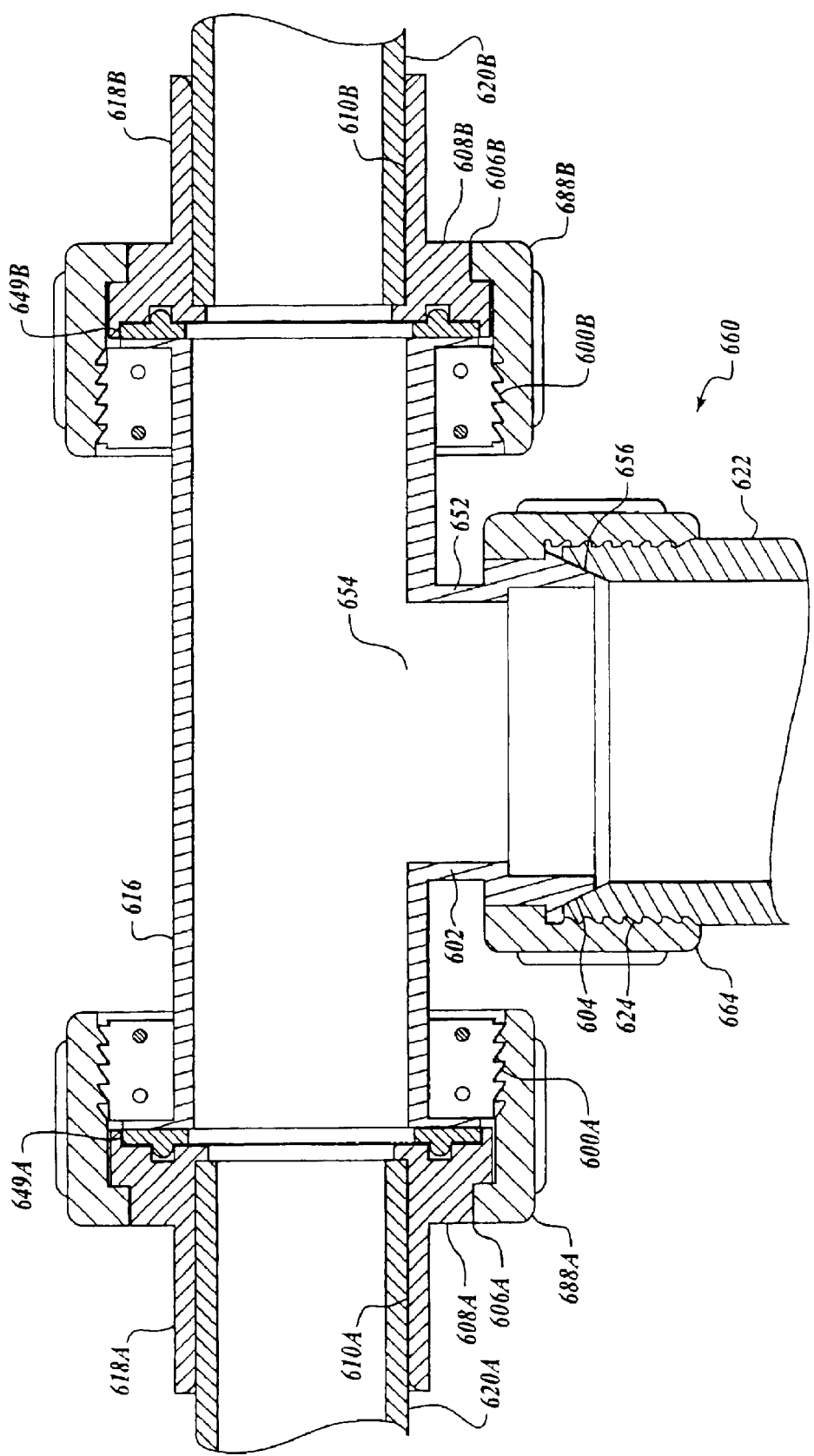
FIG. 26A is a cross-sectional view of a center segment device formed in accordance with one embodiment of the present invention, showing the center segment device loosely coupled to a third segment of tubing of a jetted bath, and further showing an alternate end fitting adapted to couple to a reduced diameter tubing of a jetted bath.

Referring to FIG. 26A, an alternate embodiment of a center segment suitably used with the embodiment illustrated in FIGS. 22A, 22B, 23, 24A, 24B, 25A, and 25B is shown. In this embodiment of the present invention, the center segment 616 includes a "T" junction with a transverse aperture 654 in the center segment 616 positioned between a pair of opposing threaded end portions 600A and 600B. A transverse pipe branch 652 extends perpendicular to the length of the center segment 616 and is connected in fluid flow communication with the transverse aperture 654. The transverse pipe branch 652 includes a circumferentially oriented flange 656.

The "T" junction of this embodiment allows the center segment 616 to be coupled in fluid flow communication with a third pipe or device, such as the discharge section 622 of a hydromassage bath jet pump. The center segment 616 may be removably secured to the transverse segment of tubing 652 by transverse fastening assembly 660. In the embodiment illustrated in FIG. 26A, fastening assembly 660 includes a union nut 664. The union nut 664 may be slidably retained about the transverse pipe branch 652 by the transverse flange 656. The pump discharge section 622 includes a threaded portion 624 located at the distal end of the discharge section 622. The transverse pipe branch 652 may be removably coupled to the discharge section 622 by rotation of the union nut 664. As the union nut 664 is rotated, the internal threads of the union nut 664 removably engage the external threads of the threaded fitting 624 of the discharge section 622. The union nut 664 is rotated further until a fluid tight seal is provided between the tubing 622 and the transverse pipe branch 652.

Figure 26B:
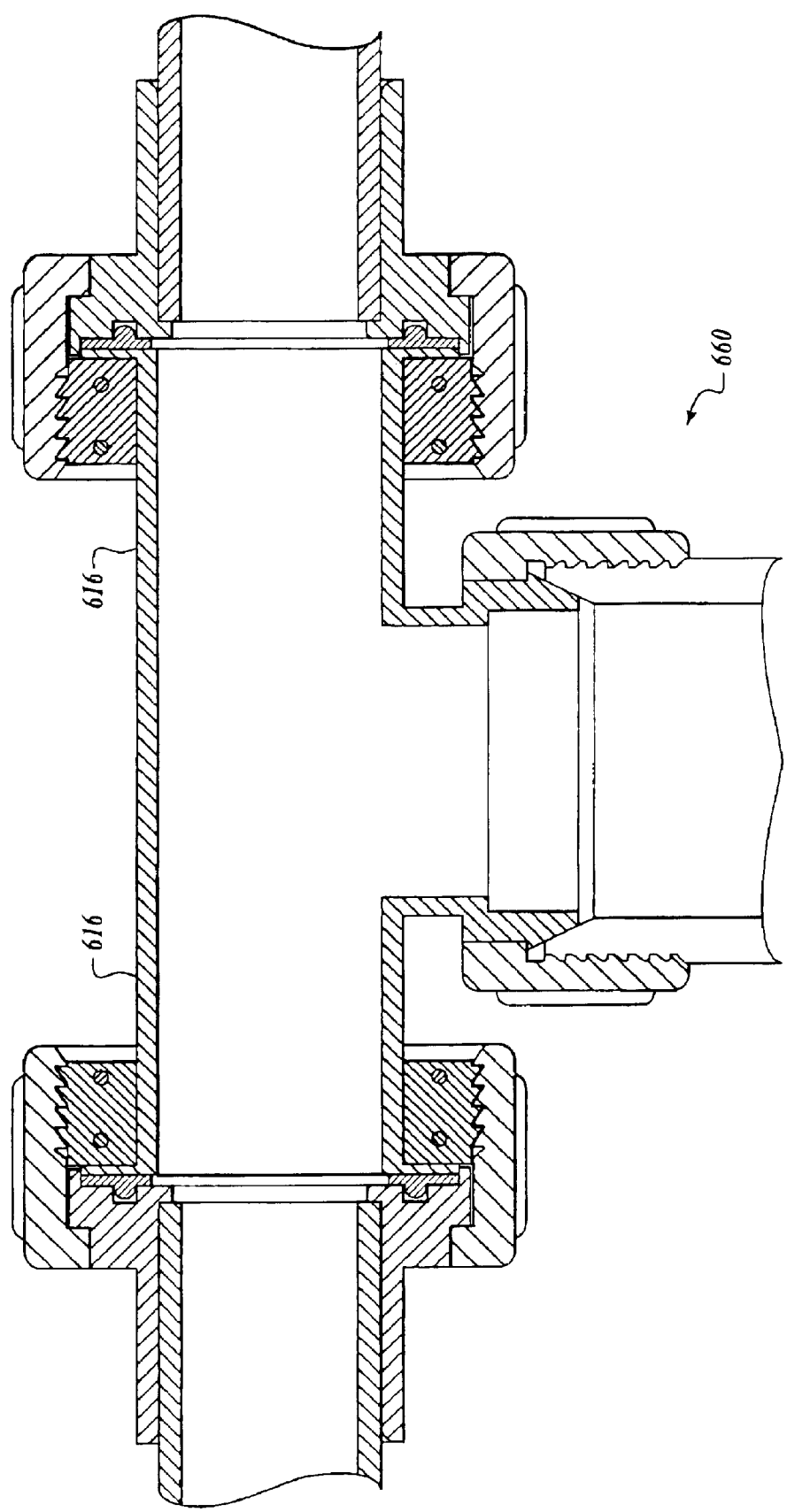
FIG. 26B is a cross-sectional view of the center segment coupled to the third segment of tubing of a jetted bath, and the alternate end fitting shown in FIG. 26A, wherein the fastening assemblies are shown in a fully fastened configuration such that extensions of the fastening assemblies extend past imaginary planes coplanar with substantially planar sealing surfaces of the center segment device.

Additionally, an inner seal (not shown for clarity) may be provided that is captured between the end surface 604 of the pump discharge section 622 and the transverse flange 656. Although a "T" junction is illustrated in the embodiment depicted in FIG. 26, it is apparent to one skilled in the art that a "T" junction may be suitably incorporated in any of the embodiments herein disclosed, and is therefore within the scope of this invention. Further, it is also apparent to one skilled in the art, that a "T" junction is also suitably incorporated in the close fit device of any of the embodiments disclosed herein and is also therefore within the scope of this invention. Further yet, it should also be apparent to one skilled in the art that a "T" fitting is shown as an illustrative example. Therefore, it should be understood that the scope of the present invention also includes junctions of configurations other than a "T" fitting, such as a 45 degree junction or one of another angle, or even a plurality of junctions in fluid continuity with either a center segment or a close fit device.

Still referring to FIG. 26A, an alternate embodiment of the end fittings 618A and 618B, suitably used with the embodiments illustrated in FIGS. 22A, 22B, 23, 24A, 24B, 25A, and 25B, is disclosed. The end fittings 618A and 618B allow the coupling of the inlet and outlet tubing 620A and 620B of a smaller diameter than of the inlet and outlet tubing 120A and 120B depicted in FIGS. 22A, 22B, 23, 24A, 24B, 25A, and 25B, Further, the end fittings 618A and 618B allow the coupling of the smaller diameter tubing 120A and 120B in combination with one-piece nuts 688A and 688B and outer seals 649A and 649B of such substantially similar size and construction to those depicted in FIGS. 22A, 22B, 23, 24A, 24B, 25A, and 25B that they are interchangeable.

More specifically and still referring to FIG. 26A, the alternate embodiment of the end fittings 618A and 618B exhibit a step down in diameter at locations 606A and 606B, creating shoulders 608A and 608B that extend inward toward a longitudinal bores 610A and 610B. The longitudinal bores 610A and 610B are sized and dimensioned to receive the outer diameter of the tubing 620A and 620B.

FIG. 27 illustrates an alternate embodiment of a close fit device 730 formed in accordance with the present invention.

The close fit device 730 of this embodiment includes a split cover 702, which provides a water-resistant environment for housing a heater control assembly. The split cover 702 includes an elongate tubular lower portion 704 and a generally rectangular top portion 706. The elongate tubular lower portion 704 is suitably sized in cross-section to surround a flanged pipe section 708. The cover is split by an imaginary plane that contains the centerline of the close fit device 730 and bisects the cover into two half sections.

At the ends of each elongate tubular lower portion 704 are integrally formed and externally threaded fittings 710. The threaded fittings include a threaded portion 718, locking pins 712, locking apertures 714, and a flange-mating surface 716. The threaded portion 718 has external threads sized and configured to communicate with internal threads of the one-piece nuts 188A and 188B of the embodiment shown in FIGS. 16A and 16B, or alternately, the one-piece nuts 488A and 488B of the embodiment shown in FIGS. 22A and 22B. The lower portion 704 of the section halves are suitably sized in the longitudinal dimension to extend between the end flanges of the pipe section 708 such that a flange-mating surface 716 abuts against the end flanges of the pipe section 708 when assembled. The locking pins 712 and locking apertures 714 are located along the surface dividing the two halves of the cover 702. The pins 712 and apertures 714 of the respective half sections are suitably positioned to provide an alignment mechanism to suitably align the half sections together during assembly.

During assembly, the two halves of the split cover 702 are positioned so that the elongate tubular lower portions 704 of the cover 702 surrounds the flanged pipe section 708. The pins 712 and apertures 714 of the respective half sections are aligned and the half sections are pressed together, enshrouding the pipe section 708. Once the two halves of the cover are aligned and in contact with one another, the two halves are fastened to one another. In the present invention, the two halves are ultrasonically welded together, though it should be apparent to one skilled in the art that other methods of sealing the halves of the cover 702 together are suitable and within the scope of this invention, such as mechanically fastening the halves together with a seal therebetween. It should also be apparent to one skilled in the art that, although a threaded fastener is shown in the illustrated embodiment, other fasteners may be suitably used and are within the scope of this invention, such as the split flanges 392A and 392B shown in FIG. 20. It should be further apparent, that the close fit device 730 of this embodiment may be suitably adaptable for use with each embodiment of the present invention.

For illustrative purposes, the illustrated embodiments of the present invention have depicted close fit devices having split fasteners, such as the close fit device 130 and split fasteners 192A and 192B (shown in FIGS. 16A and 16B), or integral fasteners, such as shown with the close fit device 430 (shown in FIG. 25). Therefore it should be apparent to one skilled in the art that a close fit device of the present invention may be suitably formed with either a split fastener device or an integral fastener. Further, it should also be apparent to one skilled in the art that a fastener may be slidably secured on the main body of the close fit device by placing the fastener about the main body of the close fit device prior to formation of flanges. Further still, split fasteners whose halves may be secured together—for example, by nut and bolt pairs connecting the halves—could also be used as a fastening device for the close fit device. Therefore, it should be apparent to one skilled in the art that within the scope of the present invention are close fit devices having either integrally formed split fasteners or fasteners placed on the close fit device prior to flange formation.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A fitting assembly for coupling a heater device to a section of piping, the fitting assembly comprising:
    (a) a first fitting adapted to be received on a first end fitting of a section of piping and configured to be selectively fastened to a first end of a heater device having a substantially planar end sealing surface;
    (b) a first coupling member adapted to be removably coupled to the first end fitting of the section of piping, the first coupling member sized and configured to restrain the first fitting when the first fitting is received on the first end fitting of the section of piping, wherein the first coupling member includes an extension which extends past the substantially planar end sealing surface of the heater device when the first fitting is fastened to the heater device; and
    (c) a seal member sized and configured to sealingly engage a portion of the first coupling member when the first coupling member is removably coupled to the heater device by the first fitting to provide a leak resistant seal between the first coupling member and the heater device.

2. The fitting assembly of claim 1, wherein the first fitting includes an annular protrusion formed in one end of the first fitting, the annular protrusion sized and positioned for engagement with a portion of the first coupling member to restrain the first fitting.

3. The fitting assembly of claim 1, wherein one end of the first coupling member includes a sealing portion adapted to sealingly engage the seal member.

4. The fitting assembly of claim 3, wherein the sealing portion is an annular seat integrally formed with the first coupling member.

5. The fitting assembly of claim 1, further comprising a second fitting adapted to be received on a second end fitting of the section of piping, the second fitting being configured to be selectively fastened to a second end of the heater device.

6. The fitting assembly of claim 5, further comprising a second coupling member adapted to be removably coupled to the second end fitting of the section of piping, the second coupling member sized and configured to restrain the second fitting to the second end fitting when the second fitting and the second coupling member are received on the second end fitting of the section of piping.

7. The fitting assembly of claim 6, wherein one end of the second coupling member includes a sealing portion adapted to sealingly engage a second seal member.

8. The fitting assembly of claim 7, wherein the second seal member is sized and configured to be received within the sealing portion of the second coupling member when the second coupling member is removably coupled to the heater device by the second fitting to provide a leak resistant seal between the coupling member and the heater device.

9. The fitting assembly of claim 1, wherein the extension of the first coupling member is configured to be received within a correspondingly-shaped receiving recess in the heater device.

10. The fitting assembly of claim 9, wherein the extension portion and the receiving recess are annularly shaped.

11. A fitting assembly for coupling a heater device to a section of piping, the fitting assembly comprising:
(a) a first fitting adapted to be received on a first end fitting of a section of piping and adapted to be selectively fastened to a first end of a heater device;
(b) a first coupling member adapted to be removably coupled to the first end fitting of the section of piping, the first coupling member having a retention portion and a recessed sealing portion;
(c) a first seal member sized and configured to be received within the recessed sealing portion of the first coupling member when the first coupling member is removably coupled to the end fitting of the section of piping to seal the end fitting of the section of piping to the heater device, wherein the first fitting is longitudinally restrained by the retention portion of the first coupling member when the first fitting and first coupling member are received on the end fitting of the section of piping; and
(d) wherein the first coupling member comprises an extension portion formed with a first end surface of the first coupling member, wherein the extension portion is configured to be received within a correspondingly shaped receiving recess in the heater device.

12. The fitting assembly of claim 11, wherein the first fitting includes an annular seat formed in one end of the first fitting, the annular seat sized and positioned for engagement with the retention portion of the first coupling member to restrain the first fitting.

13. The fitting assembly of claim 11, further comprising a second fitting adapted to be received on a second end fitting of the section of piping, the second fitting being configured to be selectively fastened to a second end of the heater device.

14. The fitting assembly of claim 13, further comprising a second coupling member adapted to be removably coupled to the second end fitting of the section of piping, the second coupling member having a retention portion and a sealing portion.

15. The fitting assembly of claim 14, wherein one end of the second coupling member includes a sealing portion adapted to sealingly engage a second seal member.

16. The fitting assembly of claim 15, wherein the second seal member is sized and configured to be received within the sealing portion of the second coupling member when the second coupling member is removably coupled to the heater device by the second fitting to provide a leak resistant seal between the coupling member and the heater device.

17. The fitting assembly of claim 11, wherein the extension portion and the receiving recess are correspondingly annularly shaped.

18. A fitting assembly for coupling a heater device to a section of piping, the fitting assembly comprising:
(a) a first fitting adapted to be received on a first end of a section of piping and adapted to be selectively fastened to a first substantially planar end sealing surface of a heater device;
(b) a second fitting adapted to be received on a second end of the section of piping that opposes the first end of the section of piping, the second fitting adapted to be selectively fastened to a second substantially planar end sealing surface of the heater device;
(c) a first coupling member adapted to be removably coupled to the first end of the section of piping, wherein the first coupling member is sized and configured to restrain the first fitting to the section of piping when the first fitting and first coupling member is received on the first end of the section of piping, wherein the first coupling member includes an extension which extends past the substantially planar end sealing surface of the heater device when the first fitting is fastened to the heater device;
(d) a second coupling member adapted to be removably coupled to the second end of the section of piping, wherein the second coupling member is sized and configured to restrain the second fitting to the section of piping when the second fitting and second coupling member is received on the second end of the section of piping, wherein the second coupling member includes an extension which extends past the second substantially planar end sealing surface of the heater device when the second fitting is fastened to the heater device; and
(e) a seal member sized and configured to sealingly engage a sealing portion of the first coupling member when the first coupling member is removably coupled to the heater device by the first fitting to provide a leak-resistant seal between the first coupling member and the heater device.

19. The fitting assembly of claim 18, wherein the first fitting includes an annular protrusion formed on one end of the first fitting, the annular protrusion sized and positioned for engagement with a portion of the first coupling member to restrain the first fitting.

20. The fitting assembly of claim 18, wherein the sealing portion is an annular seat integrally formed with the first coupling member.

21. The fitting assembly of claim 18, wherein the extension of the first coupling member is configured to be received within a correspondingly-shaped receiving recess in the heater device.

22. The fitting assembly of claim 21, wherein the extension of the first coupling member and the receiving recess are annularly shaped.

23. A combination piping section and fitting joint assembly, comprising:
(a) a section of piping having a length and a first end;
(b) a first fitting slidably received on the section of piping;
(c) a first coupling member removably secured to the first end of the section of piping, the first coupling member having a retention portion for restraining movement of the first fitting along the length of the section of piping; and
(d) a heater assembly removably coupled to the section of piping by the first fitting, wherein a portion of the first fitting engages the retention portion of the first coupling member and wherein the heater assembly is coupled in fluid flow communication with the end of the section of piping by the first coupling member to permit a leak resistant passage of fluid through the section of piping and the heater assembly.

24. The combination piping section and fitting joint assembly of claim 23, wherein the first fitting includes an annular protrusion formed in one end of the first fitting, the annular protrusion sized and positioned for engagement with the retention portion of the first coupling member to restrain the first fitting.

25. The combination piping section and fitting joint assembly of claim 23, further comprising a seal member sized and configured to sealingly engage a sealing portion of the first coupling member when the first coupling member is removably coupled to the heater device by the first fitting to provide a leak resistant seal between the first coupling member and the heater assembly.

26. The combination piping section and fitting joint assembly of claim 25, wherein the sealing portion is an annular seat integrally formed with the first coupling member.

27. The combination piping section and fitting joint assembly of claim 23, further comprising a second fitting adapted to be received on a second end of the section of piping, the second end of the section of piping being configured to be selectively fastened to a second end of the heater device.

28. The combination piping section and fitting joint assembly of claim 27, further comprising a second coupling member adapted to be removably coupled to the second end of the section of piping, the second coupling member sized and configured to restrain the second fitting to the second end of the section of piping when the second fitting and the second coupling member are received on the second end of the section of piping.

29. The combination piping section and fitting joint assembly of claim 23, wherein the first coupling member comprises an extension portion that extends longitudinally outward from a first end surface of the coupling member, wherein the extension is configured to be received within a correspondingly shaped receiving recess in the heater device.

30. The combination piping section and fitting joint assembly of claim 29, wherein the extension portion and the receiving recess are annularly shaped.

31. The combination piping section and fitting joint assembly of claim 23, wherein the heater device further comprises a hollow body disposed between an inlet and an outlet, wherein the hollow body further comprises a junction disposed between the inlet and the outlet, wherein an additional section of tubing of a jetted bath may be coupled in fluid flow communication with the junction and hollow body.

32. The combination piping section and fitting joint assembly of claim 23, wherein the heater device further comprises a split housing having a first half and a second half, wherein the first half may be joined to the second half around a hollow body of the heater device so the split housing at least partially enshrouds the heater assembly.

33. A fitting assembly for a section of piping of a jetted apparatus, the fitting assembly comprising:

(a) a first fitting adapted to be slidably received on a first end of a section of piping of a jetted apparatus;

(b) an end fitting adapted to be fastened to the first end, the end fitting having a recessed sealing portion formed on a first end surface;

(c) a sealing member sized and configured to be received within the recessed sealing portion to permit a leak resistant passage of fluid between the end fitting and one of either a heater device or a second piping section; and (d) wherein the end fitting further comprises an annular channel disposed in the sealing portion in the first end surface and wherein the sealing member further comprises an annular protruding member, wherein the annular protruding member is sized and configured to be received within the annular channel.

34. The fitting assembly of claim 33, wherein the end fitting further comprises an annular extension that extends longitudinally outward from the first end surface of the end fitting, wherein the annular extension is configured to be received within an annular receiving recess in either the heater device or the second piping section.

35. A fitting assembly for a section of piping of a jetted apparatus, the fitting assembly comprising:

(a) a first fitting adapted to be slidably received on a first end of a section of piping of a jetted apparatus;

(b) an end fitting adapted to be fastened to the first end, the end fitting having a recessed sealing portion formed on a first end surface;

(c) a sealing member sized and configured to be received within the recessed sealing portion to permit a leak resistant passage of fluid between the end fitting and one of either a heater device or a second piping section; and (d) wherein the end fitting further comprises an annular extension that extends longitudinally outward from the first end surface of the end fitting, wherein the annular extension is configured to be received within an annular receiving recess in either the heater device or the second piping section.

* * * * *